(12) United States Patent
Glasser et al.

(10) Patent No.: US 8,698,333 B2
(45) Date of Patent: Apr. 15, 2014

(54) FLUSH VALVE HYDROGENERATOR

(75) Inventors: Jamie Glasser, Morrisville, NC (US);
Scott Grace, Pinehurst, NC (US);
Steven R. Jones, Jamestown, NY (US);
John Kevin Schoolcraft, Sanford, NC (US); Robert Hill, Apex, NC (US); John Bartee, Pittsboro, NC (US); Zack Blackmon, III, Raleigh, NC (US)

(73) Assignee: Zurn Industries, LLC, Erie, PA (US)

( * ) Notice: Subject to any disclaimer, the term of this patent is extended or adjusted under 35 U.S.C. 154(b) by 456 days.

(21) Appl. No.: 12/887,756

(22) Filed: Sep. 22, 2010

(65) Prior Publication Data
US 2011/0071698 A1   Mar. 24, 2011

Related U.S. Application Data

(60) Provisional application No. 61/244,970, filed on Sep. 23, 2009.

(51) Int. Cl.
*F03B 13/00* (2006.01)

(52) U.S. Cl.
USPC .............................................. 290/43; 290/54

(58) Field of Classification Search
USPC .............................................. 290/52, 43, 54
IPC ...... F01D 15/10; F03B 13/00,3/00, 3/02; H02K 7/1823
See application file for complete search history.

(56) References Cited

U.S. PATENT DOCUMENTS

| | | |
|---|---|---|
| 1,402,771 A | 1/1922 | Johns |
| 3,233,165 A | 2/1966 | Bedford |
| 3,575,640 A | 4/1971 | Ishikawa |
| 3,761,795 A | 9/1973 | Clayton et al. |
| 3,867,682 A | 2/1975 | Yamauchi et al. |
| 3,917,017 A | 11/1975 | Deane |
| 4,122,381 A | 10/1978 | Sturm |
| 4,321,523 A | 3/1982 | Hammel |
| 4,485,310 A | 11/1984 | de Valroger |
| 4,520,516 A | 6/1985 | Parsons |
| 4,524,285 A | 6/1985 | Rauch |
| 4,555,637 A | 11/1985 | Irvine |
| 4,564,889 A | 1/1986 | Bolson |
| 4,604,735 A | 8/1986 | Parsons |
| 4,616,298 A | 10/1986 | Bolson |
| 4,629,904 A | 12/1986 | Rojo, Jr. et al. |
| 4,731,545 A | 3/1988 | Lerner et al. |
| 4,839,039 A | 6/1989 | Parsons et al. |
| 4,886,207 A | 12/1989 | Lee et al. |
| 4,920,465 A | 4/1990 | Sargent |

(Continued)

FOREIGN PATENT DOCUMENTS

| | | |
|---|---|---|
| JP | 6-37096 Y2 | 9/1994 |
| JP | 2000-17707 A | 1/2000 |

(Continued)

*Primary Examiner* — Vanessa Girardi
(74) *Attorney, Agent, or Firm* — The Webb Law Firm

(57) ABSTRACT

A power generating device for use with a plumbing fixture includes: a volute configured to receive water from a water supply pipe; a stator having a plurality of blades positioned around a circumference thereof positioned within the volute; a rotor positioned within the stator; and a generator coupled to the rotor. The volute directs substantially all of the water received from the water supply pipe in a circumferential direction through the plurality of blades of the stator to the rotor, thereby causing the rotor to rotate.

15 Claims, 18 Drawing Sheets

(56) References Cited

U.S. PATENT DOCUMENTS

| | | |
|---|---|---|
| 4,936,508 A | 6/1990 | Ingalz |
| 4,963,780 A | 10/1990 | Hochstrasser |
| 4,969,797 A | 11/1990 | Takara et al. |
| 5,089,763 A | 2/1992 | Van Der Linden et al. |
| 5,224,685 A | 7/1993 | Chiang et al. |
| 5,225,689 A | 7/1993 | Buckle et al. |
| 5,349,985 A | 9/1994 | Fischer |
| 5,559,379 A | 9/1996 | Voss |
| 5,629,606 A | 5/1997 | Asada |
| 5,699,833 A | 12/1997 | Tsataros |
| 5,769,177 A | 6/1998 | Wickman |
| 5,915,417 A | 6/1999 | Diaz et al. |
| 5,950,983 A | 9/1999 | Jahrling |
| 6,036,333 A | 3/2000 | Spiller |
| 6,061,843 A | 5/2000 | Rump et al. |
| 6,158,541 A | 12/2000 | Tabata et al. |
| 6,161,814 A | 12/2000 | Jahrling |
| 6,195,588 B1 | 2/2001 | Gauthier et al. |
| 6,219,857 B1 | 4/2001 | Wu |
| 6,250,601 B1 | 6/2001 | Kolar et al. |
| 6,481,634 B1 | 11/2002 | Zosimadis |
| 6,499,152 B2 | 12/2002 | Johnson |
| 6,509,652 B2 | 1/2003 | Yumita |
| 6,559,553 B2 | 5/2003 | Yumita et al. |
| 6,560,790 B2 | 5/2003 | Saar et al. |
| 6,639,328 B2 | 10/2003 | Wacknov |
| 6,671,893 B1 | 1/2004 | Quintana et al. |
| 6,701,194 B2 | 3/2004 | Gauthier et al. |
| 6,768,218 B2 | 7/2004 | Yumita |
| 6,798,080 B1 | 9/2004 | Baarman et al. |
| 6,864,591 B2 | 3/2005 | DeFrank |
| 6,876,100 B2 | 4/2005 | Yumita |
| 6,877,170 B1 | 4/2005 | Quintana et al. |
| 6,885,114 B2 | 4/2005 | Baarman et al. |
| 6,894,270 B2 | 5/2005 | Bailey |
| 6,913,203 B2 | 7/2005 | DeLangis |
| 6,927,501 B2 | 8/2005 | Baarman et al. |
| 7,005,758 B2 | 2/2006 | Yumita et al. |
| 7,067,936 B2 | 6/2006 | Baarman et al. |
| 7,075,768 B2 | 7/2006 | Kaneko |
| 7,112,892 B2 | 9/2006 | Mahowald |
| 7,119,451 B2 | 10/2006 | Baarman et al. |
| 7,213,782 B2 | 5/2007 | Osborne et al. |
| 7,230,346 B2 | 6/2007 | Mahowald |
| 7,233,078 B2 | 6/2007 | Baarman et al. |
| 7,253,536 B2 | 8/2007 | Fujimoto et al. |
| 7,326,334 B2 | 2/2008 | Boyd et al. |
| 7,370,824 B1 | 5/2008 | Osborne |
| 7,382,061 B2 | 6/2008 | Ferraro |
| 7,396,000 B2 | 7/2008 | Parsons et al. |
| 7,462,945 B2 * | 12/2008 | Baarman et al. ............... 290/43 |
| 7,462,948 B2 | 12/2008 | Toriyama |
| 7,468,564 B2 | 12/2008 | Crisafulli |
| 7,521,815 B2 | 4/2009 | Lee et al. |
| 2002/0041100 A1 | 4/2002 | Yumita et al. |
| 2002/0047374 A1 | 4/2002 | Yumita |
| 2002/0113442 A1 | 8/2002 | Yumita |
| 2002/0121617 A1 | 9/2002 | Hu |
| 2003/0041370 A1 | 3/2003 | Chung |
| 2003/0127861 A1 | 7/2003 | Yumita et al. |
| 2003/0164612 A1 | 9/2003 | Yumita |
| 2004/0041110 A1 | 3/2004 | Kaneko |
| 2004/0195840 A1 | 10/2004 | Baarman et al. |
| 2005/0006903 A1 | 1/2005 | Yumita et al. |
| 2005/0077732 A1 | 4/2005 | Baarman et al. |
| 2005/0098485 A1 | 5/2005 | Boyd et al. |
| 2005/0161949 A1 | 7/2005 | Baarman et al. |
| 2005/0189769 A1 | 9/2005 | Baarman et al. |
| 2005/0189770 A1 | 9/2005 | Baarman et al. |
| 2006/0006354 A1 | 1/2006 | Guler et al. |
| 2007/0034258 A1 | 2/2007 | Parsons et al. |
| 2007/0037470 A1 | 2/2007 | Rothan |
| 2007/0057215 A1 | 3/2007 | Parsons et al. |
| 2007/0102046 A1 | 5/2007 | Kimura et al. |
| 2007/0120368 A1 | 5/2007 | Baarman et al. |
| 2007/0246941 A1 | 10/2007 | Tanaka et al. |
| 2007/0257803 A1 | 11/2007 | Munro et al. |
| 2007/0284552 A1 | 12/2007 | Khorshid |
| 2008/0010734 A1 | 1/2008 | Chang |
| 2008/0060184 A1 | 3/2008 | Baarman et al. |
| 2008/0061557 A1 | 3/2008 | Baarman et al. |
| 2008/0061558 A1 | 3/2008 | Baarman et al. |
| 2008/0078014 A1 | 4/2008 | Wilson et al. |
| 2008/0087856 A1 | 4/2008 | Wilson et al. |
| 2008/0116147 A1 | 5/2008 | Baarman et al. |
| 2008/0136190 A1 | 6/2008 | Lee et al. |
| 2008/0136191 A1 | 6/2008 | Baarman et al. |
| 2008/0217923 A1 | 9/2008 | Yen |
| 2008/0231051 A1 | 9/2008 | Toriyama |
| 2008/0231056 A1 | 9/2008 | Wen |
| 2008/0246282 A1 | 10/2008 | Hathaway et al. |
| 2008/0284174 A1 | 11/2008 | Nagler |
| 2008/0284175 A1 | 11/2008 | Nagler |
| 2009/0000023 A1 | 1/2009 | Wegelin et al. |
| 2009/0008943 A1 | 1/2009 | Kemper |
| 2009/0026768 A1 | 1/2009 | Shimizu et al. |
| 2009/0026769 A1 | 1/2009 | Shimizu et al. |
| 2009/0049599 A1 | 2/2009 | Parsons et al. |
| 2009/0077736 A1 | 3/2009 | Loberger et al. |

FOREIGN PATENT DOCUMENTS

| | | |
|---|---|---|
| JP | 2000-27262 A | 1/2000 |
| JP | 2001-124058 A | 5/2001 |
| JP | 2003-96869 A | 4/2003 |
| JP | 2003-105818 A | 4/2003 |
| JP | 2004-257143 A | 9/2004 |
| JP | 2005-2570 A | 1/2005 |
| JP | 2006-70865 A | 3/2006 |

\* cited by examiner

FLUSH VALVE HYDROGENERATOR

CROSS REFERENCE TO RELATED APPLICATIONS

This application claims priority to U.S. Provisional Patent Application Ser. No. 61/244,970 entitled "Flush Valve Hydrogenerator" filed Sep. 23, 2009, the entire disclosure of which is hereby incorporated by reference in its entirety.

BACKGROUND OF THE INVENTION

1. Field of the Invention

The present invention is generally related to flush valves for water closets, urinals, and the like and, more specifically, to an electric power generation device for use with such a flush valve.

2. Description of Related Art

Hydroelectric power generation in which kinetic energy is extracted from flowing pressurized water and used to rotate a generator to produce electric power is known. With large hydroelectric power generation operated with a large-scale water source such as a river or dam, thousands of megawatts of power may be generated using millions of gallons of flowing water. As such, conversion of the kinetic energy in the flowing water to electric power may include significant inefficiencies and yet still provide an economical and acceptable level of performance.

Automatic plumbing fixtures, such as toilet valves and sink faucets, may include an electrically operated valve and a sensor. The sensor may sense the presence of a user of the automatic plumbing fixture and operate the electrically operated valve to provide a flow of water in response. Both the electrically operated valve and the sensor require electric power to operate. The power may be obtained by installing an electric cable from a power distribution panel to the automatic plumbing fixture. Where the automatic plumbing fixture is installed in an existing building, installation of a power distribution panel and/or an electric cable can be costly, time consuming, and difficult. Accordingly, hydroelectric generators for use with such plumbing fixtures have been developed. However, it is difficult to generate enough power using such a small hydrogenerating device and small-scale water source.

For instance, U.S. Pat. No. 7,253,536 to Fujimoto et al. is directed to a toilet bowl flushing apparatus (1) including an apparatus body (6) disposed in the inside of a casing (5). The apparatus body (6) includes a cylindrical water inlet (10) which is communicably connected with a water supply pipe (2) and a cylindrical water outlet (11) which is communicably connected with the toilet bowl (3). The apparatus body (6) further includes an open/close valve (12) disposed on a downstream side of the water inlet (10), and an electromagnetic valve (18) connected with a control unit (20). A power generating unit (23) including a holder (26), an impeller (27), an intermediate cover (28), a coil (29), and a cover (30) is also positioned within apparatus body (6). However, the power generating unit is positioned within apparatus body (6) such that only a portion of the water received from water supply pipe (2) passes over the impeller (27). Accordingly, a large amount of the energy of the water from water supply pipe (2) is lost and not converted into electrical energy.

In addition, U.S. Pat. No. 7,233,078 to Baarman et al. discloses a urinal (2100) that is included as part of the hydropower generation system. The urinal (2100) includes a water inlet (2102) for receiving water and a water outlet (2104) for discharging water. The urinal (2100) also includes a valve module (2106), an electronics module (2108), and a power generation module (2110). The valve module (2106) includes an electrically operated valve (2202). Upon energization, the electrically operated valve (2202) may move to a position that opens a liquid flow path through the valve module (2106). When the liquid flow path is opened, pressurized liquid supplied at the inlet (2102) may flow through the valve module (2106) and the power generation module (2110) to the outlet (2104). Upon de-energization, the electrically operated valve (2202) may close off the liquid flow path, stopping the flow of liquid through the valve module (2106) and the power generation module (2110). The power generation module (2110) includes an outer housing (1102), an inner housing (1104), a centering rod (1106), and a nozzle (1108). The outer housing (1102) also includes a scupper (2204) to channel liquid toward the outlet (2104) following impact with the inner housing (1104). The inner housing (1104) pressurizes liquid provided to the inlet (2102) which is accelerated to a high velocity by the nozzle (1108) and directed in a stream of liquid at the paddles (1118) positioned on the outer surface of the inner housing (1104). Like with the Fujimoto patent, only a small portion of the water received from the water inlet (2102) is directed through nozzle (1108) onto the paddles (1118) of the power generation module (2110). Therefore, a large amount of the energy of the flowing water is lost and not converted into electrical energy.

Accordingly, a need exists for an efficient hydrogenerator device for use with a plumbing fixture. More specifically, a need exists for a hydrogenerator device that directs substantially all of the water from a water inlet over the blades of a rotor to efficiently generate electrical power from the flow of water.

SUMMARY OF THE INVENTION

An object of the present invention is to provide an efficient hydrogenerator device for use with a flush valve or other plumbing fixture that directs substantially all of the water from a water inlet over the blades of a rotor to efficiently generate electrical power from the flow of water. It is a further object of the present invention to provide a control device for controlling the flush valve or other plumbing fixture using the electrical power generated by the hydrogenerator device.

The present invention is directed to a power generating device for use with a flush valve. The power generating device includes: a volute configured to receive water from a water supply pipe; a stator having a plurality of blades positioned around a circumference thereof positioned within the volute; a rotor positioned within the stator; and a generator coupled to the rotor. The volute directs substantially all of the water received from the water supply pipe in a circumferential direction through the plurality of blades of the stator to the rotor, thereby causing the rotor to rotate.

The rotor may be provided as a Francis-type turbine. The generator may be a three-phase A.C., brushless motor having a drive shaft. The rotor may be configured to be coupled to the drive shaft of the motor. The rotation of the rotor, therefore, would cause rotation of the drive shaft of the motor, thereby generating electricity.

The present invention is also directed to a hydrogenerator flush valve that includes: a housing; a solenoid valve disposed in the housing and configured to allow water to flow into the housing from a water supply pipe when in a first position and prevent water from flowing into the housing from the water supply pipe when in a second position; and a hydrogenerator disposed in the housing. The hydrogenerator includes: a volute configured to receive water from a water supply pipe; a stator having a plurality of blades positioned around a circumference thereof and positioned within the volute; a rotor positioned within the stator; and a generator coupled to the rotor. The hydrogenerator flush valve operates as follows: water received from the water supply pipe when the solenoid valve is in a first position takes an approximately 90° turn within the housing and substantially all of the water is directed to the volute, such that the water is directed in a circumferential direction by the volute through the plurality of blades of the stator to the rotor, thereby causing the rotor to rotate.

The rotor may be provided as a Francis-type turbine. The generator may be a three-phase A.C., brushless motor having a drive shaft. The rotor may be configured to be coupled to the drive shaft of the motor. The rotation of the rotor, therefore, would cause rotation of the drive shaft of the motor, thereby generating electricity.

The hydrogenerator flush valve may further include control and charging circuitry operationally coupled to the solenoid valve and the hydrogenerator. The control and charging circuitry may be configured to store electrical energy generated by the hydrogenerator on at least one supercapacitor. The electrical energy stored on the at least one supercapacitor may be used to power the solenoid valve. A sensor array operationally coupled to the control and charging circuitry may be provided for detecting the presence of a user. The control and charging circuitry may be used to control the solenoid valve to move from the first position to the second position and vice versa based on feedback from the sensor array.

In addition, the present invention is directed to a control apparatus for a hydrogenerator flush valve. The control apparatus includes: an electric power generation device provided in a fluid path of the hydrogenerator flush valve; a load switch coupled between the electric power generation device and at least one supercapacitor; and a solenoid valve operationally coupled to the at least one supercapacitor and configured to allow water to flow into the hydrogenerator flush valve from a water supply pipe when in a first position and prevent water from flowing into the hydrogenerator flush valve from the water supply pipe when in a second position. The at least one supercapacitor is charged by the electric power generation device and power requirements of the solenoid valve are satisfied by the at least one supercapacitor. The load switch opens when the at least one supercapacitor is completely charged.

The control apparatus may further include a battery operationally coupled to the solenoid valve. The battery may be provided to satisfy the power requirements of the solenoid valve when the charge on the at least one supercapacitor drops below a threshold level. The electric power generation device may include: a stator having a plurality of blades positioned around a circumference thereof; a rotor positioned within the stator; and a generator coupled to the rotor. The control apparatus may also include a microcontroller operationally coupled to the load switch for controlling the state of the load switch and a communication interface configured to allow the microcontroller to communicate with remote electrical devices.

The present invention is also directed to a method for detecting a user of a plumbing installation having a sensor array comprising a first infrared emitter, a second infrared emitter, an infrared detector, and an ambient light detector. The method includes: determining a change in an ambient light level using the ambient light detector at a default sampling rate; comparing the changes in the ambient light level to a threshold level; and, if the changes in the ambient light level exceed the threshold level, emitting a signal from the first infrared emitter and the second infrared emitter to determine if a user is present using the infrared detector.

The first infrared emitter, the second infrared emitter, the infrared detector, and the ambient light detector may be positioned in a vertical row. The first infrared emitter may be positioned at a top of the vertical row, the second infrared emitter may be at the bottom of the vertical row, and the ambient light detector and the infrared detector may be positioned midway between the first infrared emitter and the second infrared emitter. The infrared detector and the ambient light detector may be provided in a single integrated circuit. The infrared detector and the ambient light detector may be positioned behind a focusing lens.

The default sampling rate may be 2 seconds. The sensor array may be operatively coupled to a microcontroller and the ambient light sensor may determine data to allow the microcontroller to place the sensor array into a power saving mode. The ambient light sensor may determine the ambient light level of an environment for a period of seven days to determine hours of inactivity and low light. In hours of inactivity and low light, the default sampling rate may be raised to 10 seconds.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PRESENT INVENTION

Figure 1:
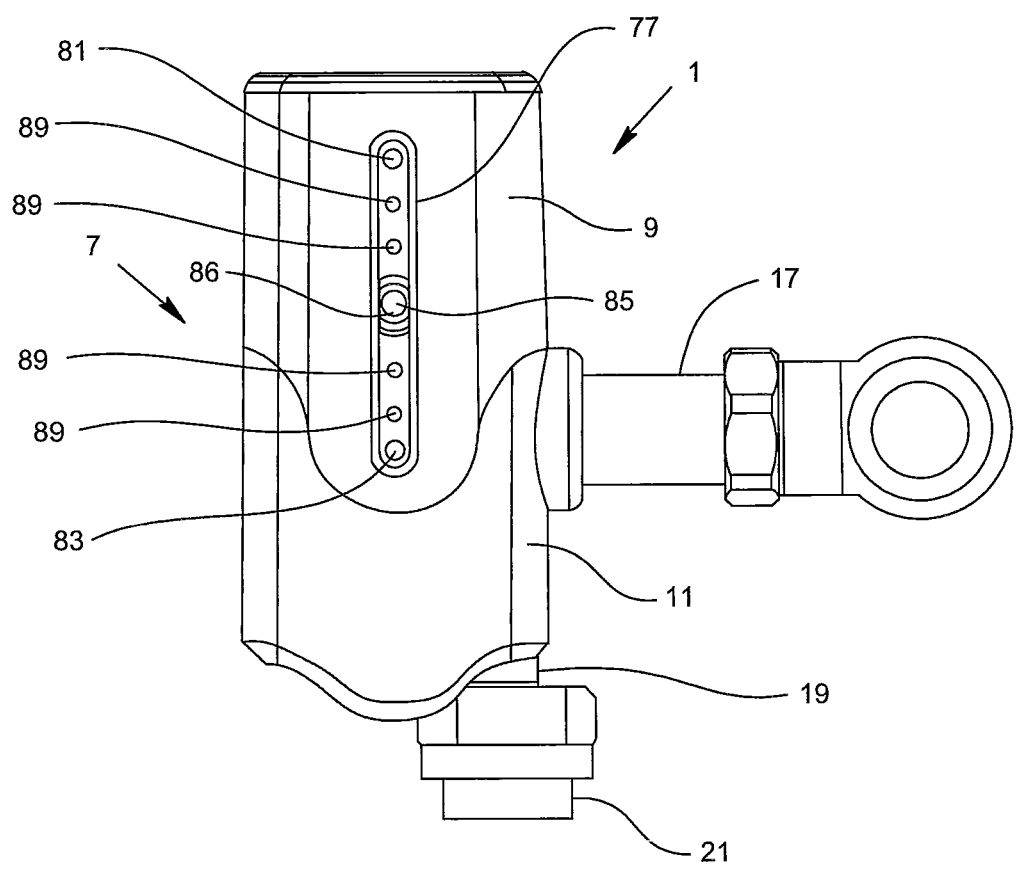
FIG. 1 is a front plan view of a hydrogenerator flush valve in accordance with the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
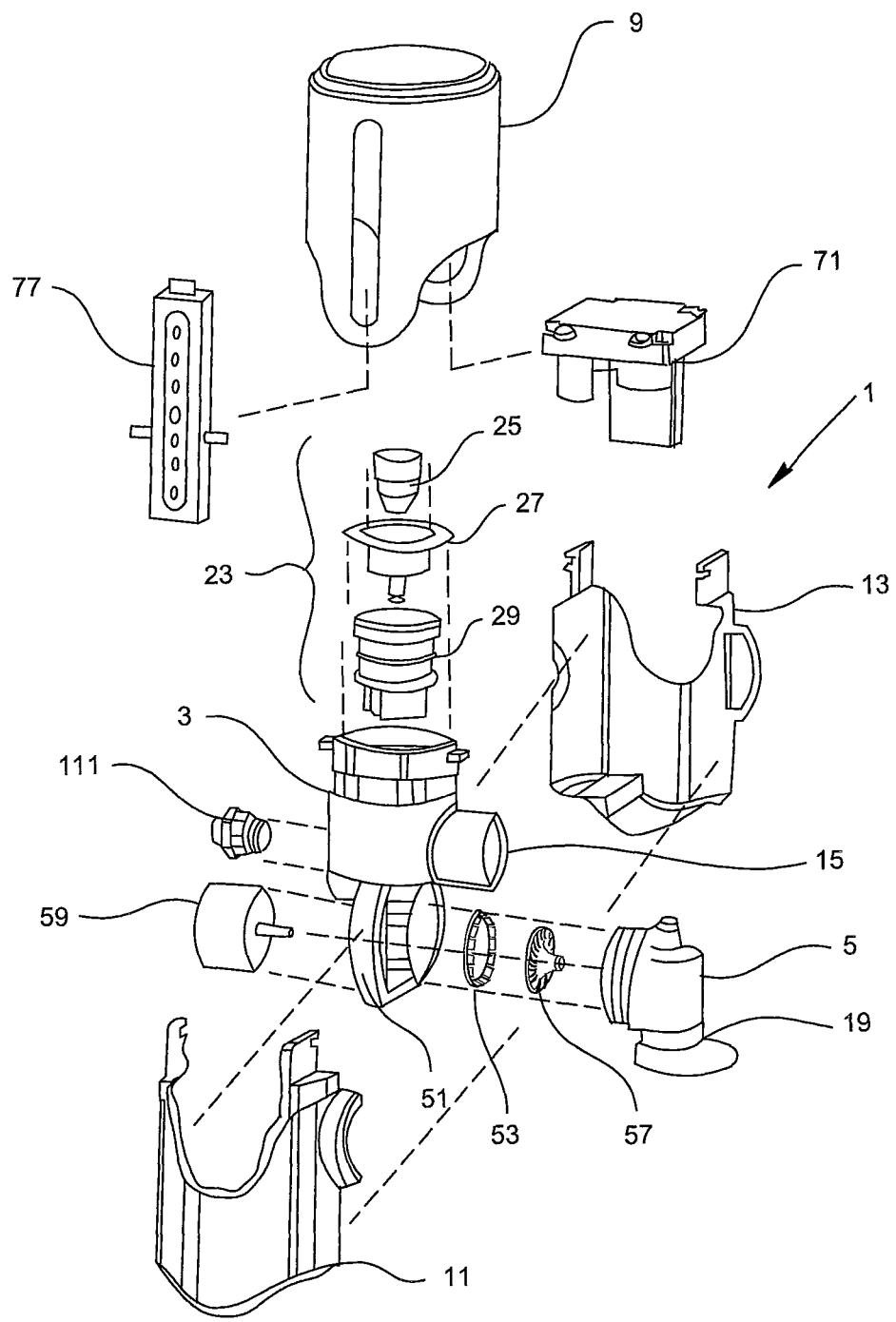
FIG. 2 is an exploded perspective view of the hydrogenerator flush valve of FIG. 1.

With reference to FIGS. 1 and 2, a hydrogenerator flush valve, generally denoted as reference numeral 1, includes a primary valve casing 3 and a secondary valve casing 5 disposed within a housing, generally denoted as reference numeral 7. Housing 7 has a split construction and is constituted of an upper valve cap 9, which covers an upper portion of primary valve casing 3, a front cover 11 which covers a lower portion of a front side of primary valve casing 3 and secondary valve casing 5, and a rear cover 13 which covers a lower portion of a rear side of primary valve casing 3 and secondary valve casing 5.

Primary valve casing 3 includes a cylindrical water inlet 15 that is communicably connected with a water supply pipe 17 and is formed in an approximately middle right side portion thereof. In addition, secondary valve casing 5 includes a cylindrical water outlet 19 which is communicably connected, via a water outlet pipe 21, with a toilet bowl (not shown). Cylindrical water outlet 19 is formed on a lower portion of secondary valve casing 5.

Hydrogenerator flush valve 1 further includes an open/close valve 23 that is disposed within primary valve casing 3 on a downstream side of water inlet 15. Open/close valve 23 includes a solenoid valve 25, a solenoid flange 27, and a piston kit 29.

Figure 3A:
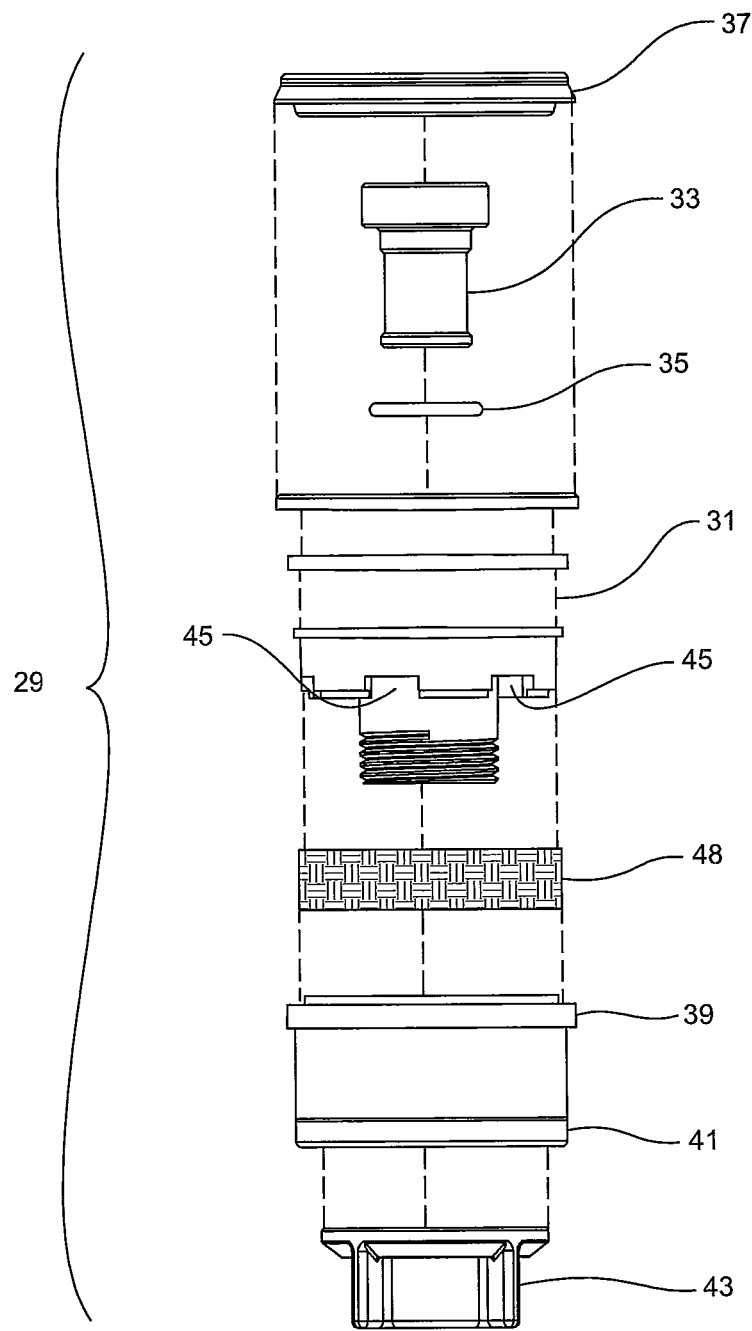
FIG. 3A is an exploded front view of a piston kit for use with the hydrogenerator flush valve in a water closet in accordance with the present invention.
Figure 3B:
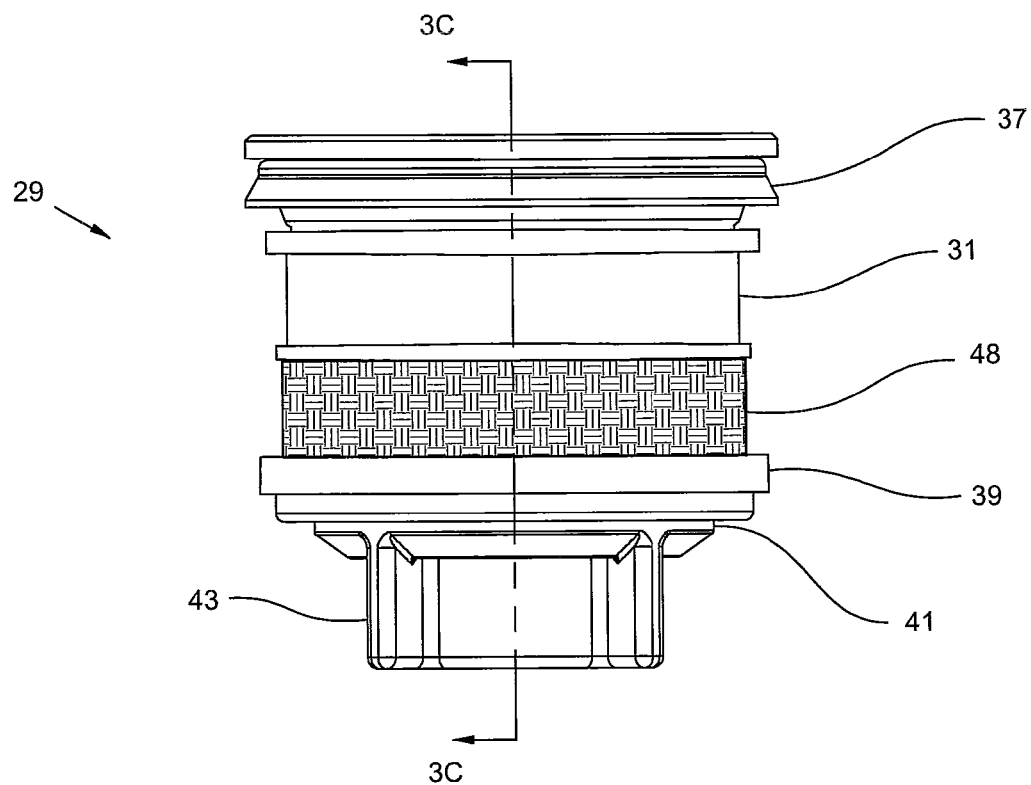
FIG. 3B is an assembled front plan view of the piston kit of FIG. 3A.
Figure 3C:
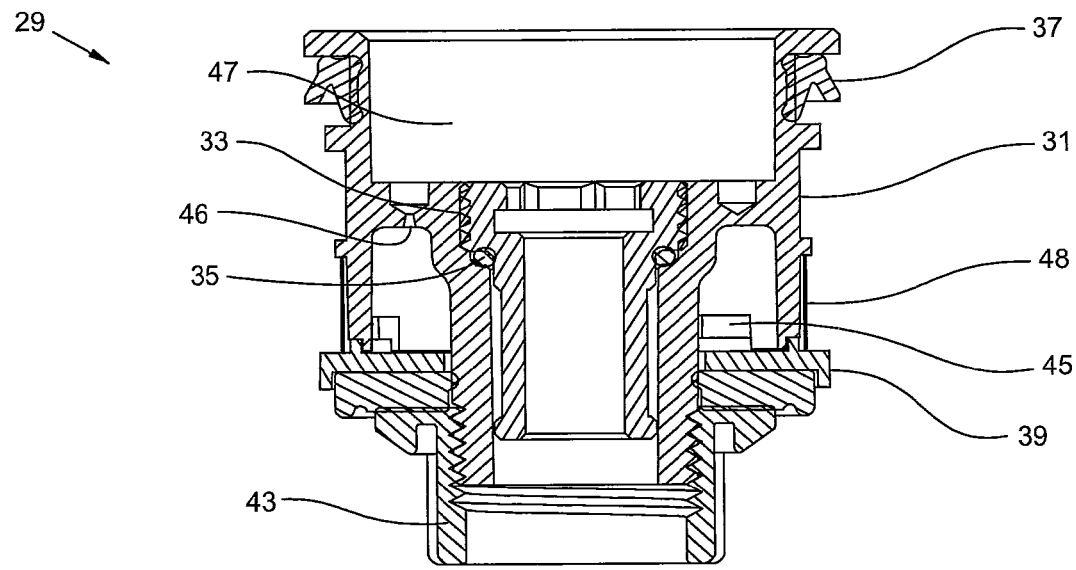
FIG. 3C is a cross-sectional view of the piston kit of FIG. 3A taken along line 3C-3C.
Figure 3D:
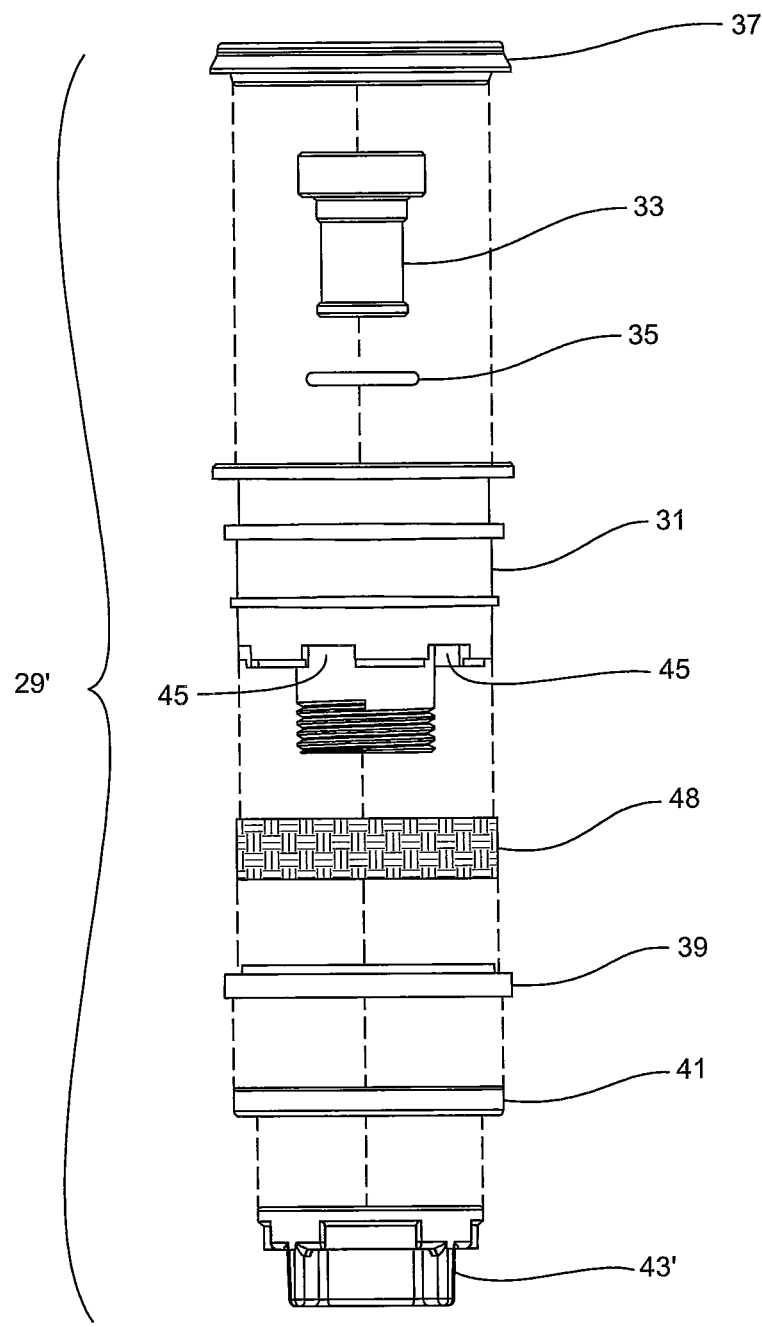
FIG. 3D is an exploded front view of a piston kit for use with the hydrogenerator flush valve in a urinal in accordance with the present invention.
Figure 3E:
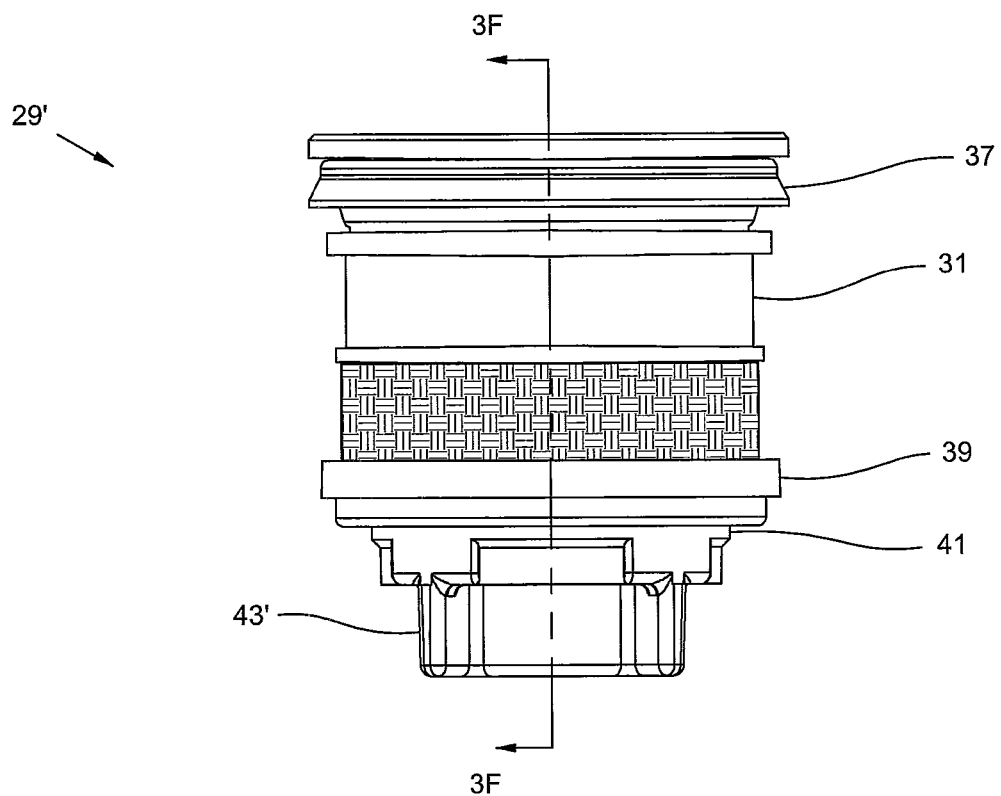
FIG. 3E is an assembled front plan view of the piston kit of FIG. 3D.
Figure 3F:
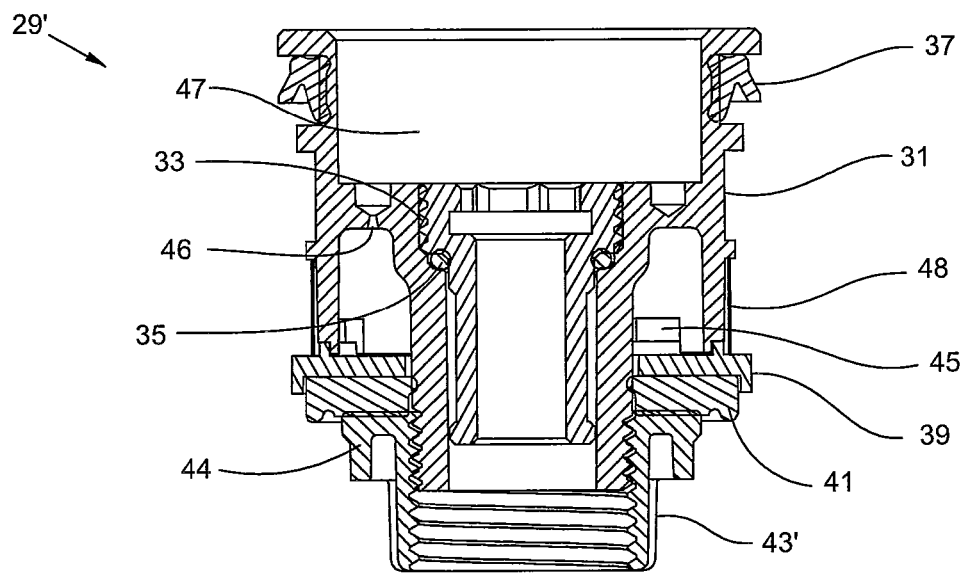
FIG. 3F is a cross-sectional view of the piston kit of FIG. 3E taken along line 3F-3F.

With reference to FIGS. 3A-3C and with continued reference to FIGS. 1 and 2, piston kit 29 includes a piston body 31. A brass insert 33 and sealing member 35 are disposed within piston body 31. The top of piston body 31 is sealed with a cup seal 37. A bottom portion of piston body 31 is sealed with a piston base 39 and face seal 41. A flow ring nut 43 is coupled to the bottom of face seal 41. A plurality of holes 45 is disposed around the circumference of a bottom portion of piston body 31. Desirably, six holes 45 are provided to allow water to flow inside piston kit 29. An orifice hole 46 is also provided in piston body 31 to allow the water entering through holes 45 to enter an upper chamber 47 of piston body 31. A piston screen 48 is positioned around holes 45 to prevent particulate matter from entering piston body 31 and clogging orifice hole 46. Piston kit 29 is configured to be used with hydrogenerator flush valve 1 when hydrogenerator flush valve 1 is installed in a water closet or toilet. Alternatively, hydrogenerator flush valve 1 may be installed in a urinal. When hydrogenerator flush valve 1 is installed in a urinal, a different piston kit 29' is provided as illustrated in FIGS. 3D-3F. Piston kit 29' is identical to piston kit 29 except for the design of flow ring nut 43'. Flow ring nut 43', as can be seen in FIGS. 3D-3F, includes a larger, upper brim 44 than flow ring nut 43 of piston kit 29. This allows for a lesser flow rate for the hydrogenerator flush valve 1 when it is implemented in a urinal, thereby allowing the urinal to function properly.

Figure 4A:
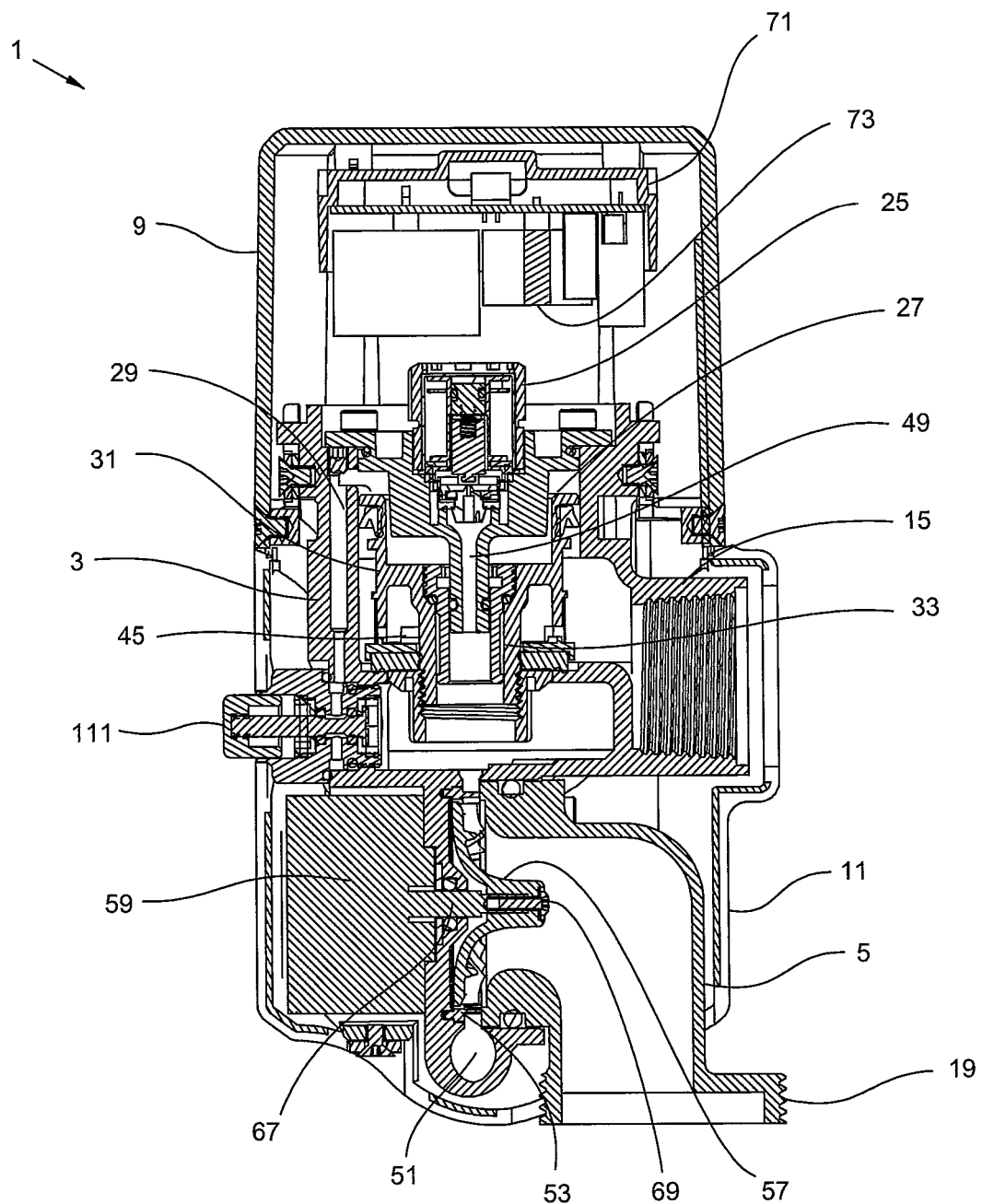
FIG. 4A is a cross-sectional view of the hydrogenerator flush valve of FIG. 1 when the piston kit is in a first position.
Figure 4B:
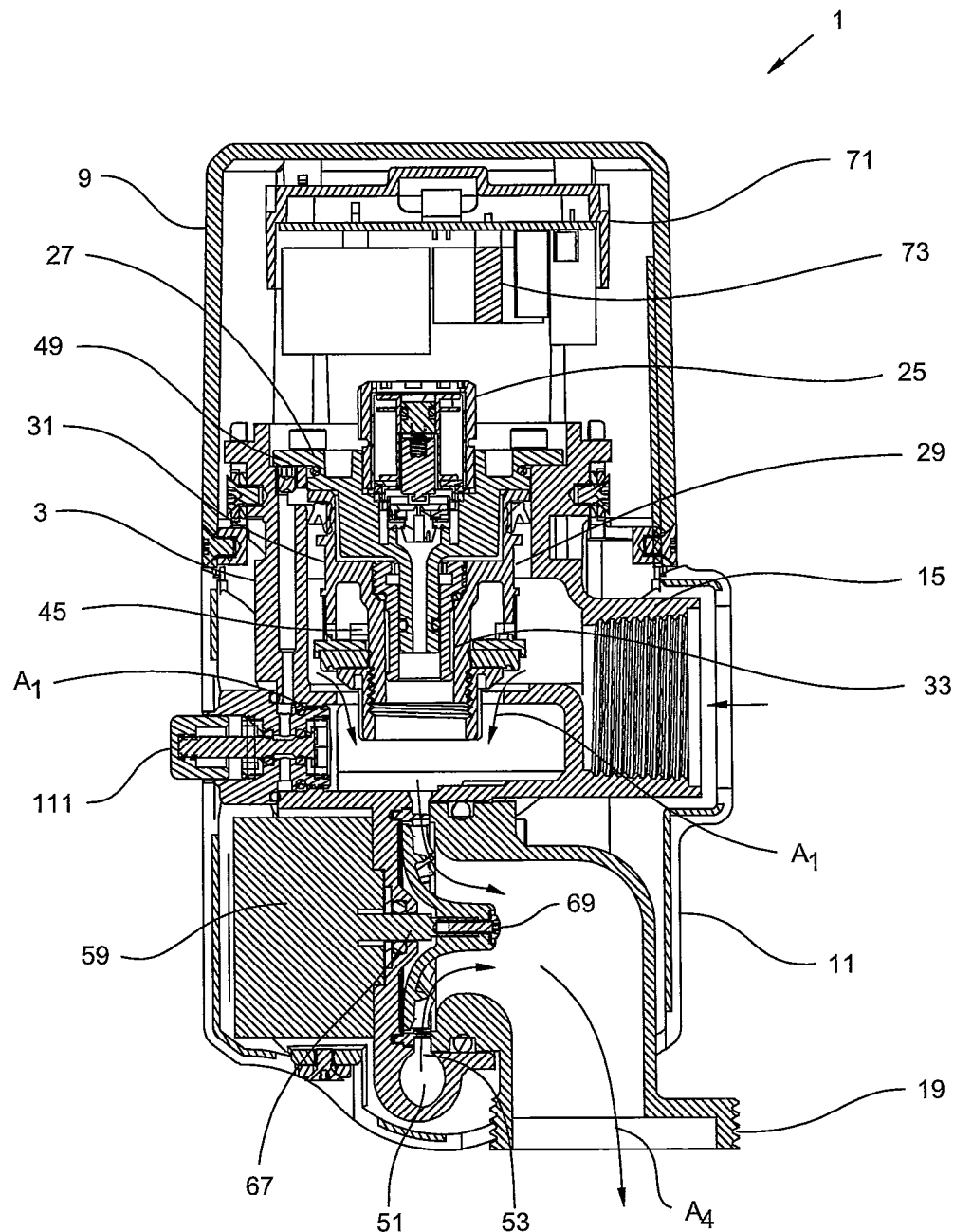
FIG. 4B is a cross-sectional view of the hydrogenerator flush valve of FIG. 1 when the piston kit is in a second position.

With reference to FIGS. 4A and 4B and with continued reference to FIGS. 3A-3F, the operational features of piston kit 29, 29' will be described. Initially, solenoid valve 25 is in a closed, first position, as shown in FIG. 3D, and water is permitted to enter piston body 31 through holes 45. The water proceeds to fill upper chamber 47 through orifice hole 46. Thereafter, solenoid valve 25 is controlled by a control system, as will be described hereinafter, to move to an open, second position, as shown in FIG. 4B. This allows the water in upper chamber 47 to evacuate through a passage 49 in solenoid flange 27, thereby causing piston kit 29, 29' to move upward and allow water from water supply pipe 17 to escape from water outlet pipe 21 and evacuate the toilet bowl. Thereafter, solenoid valve 25 is controlled to return to the closed, first position and water enters piston body 31 through holes 45 and fills upper chamber 47 through orifice hole 46. This causes the pressure to rise in upper chamber 47 until piston kit 29, 29' has sealed to valve casing 3 with face seal 41, thereby blocking the flow of water from water supply pipe 17 as shown in FIG. 4A.

While hydrogenerator flush valve 1 has been described hereinabove as including a piston kit 29, 29' as shown in FIGS. 3A-3C or 3D-3F, this is not to be construed as limiting the present invention as any suitable piston kit may be utilized.

With reference to FIGS. 5A-5C and 6A-6F and with continued reference to FIGS. 1 and 2, hydrogenerator flush valve 1 further includes a power generating device disposed within primary valve casing 3 and secondary valve casing 5. The power generating device includes: a volute 51 formed in primary valve casing 3 and configured to receive water from water supply pipe 17; a stator 53 having a plurality of blades 55 positioned around a circumference thereof positioned within volute 51; a rotor 57 positioned within the stator 53; and a generator 59 coupled to rotor 57. The beginning of volute 51 starts 30 degrees from a centerline of primary valve casing 3 and sweeps 300 degrees about the axis of stator 53 and rotor 57. The diameter of volute 51 across this sweep reduces from about 13.5 mm to about 4.6 mm.

Figure 5C:
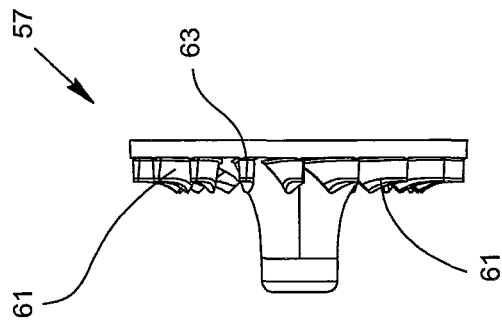
FIGS. 5A-5C are a cross-sectional view, a top plan view, and a side view, respectively, of a rotor of a power generating device of the hydrogenerator flush valve in accordance with the present invention.
Figure 5B:
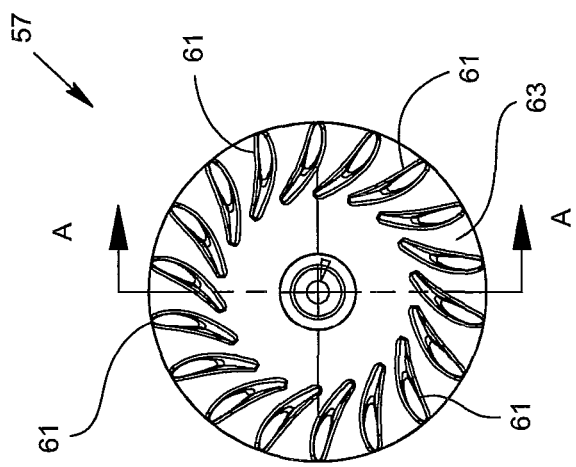
Figure 5A:
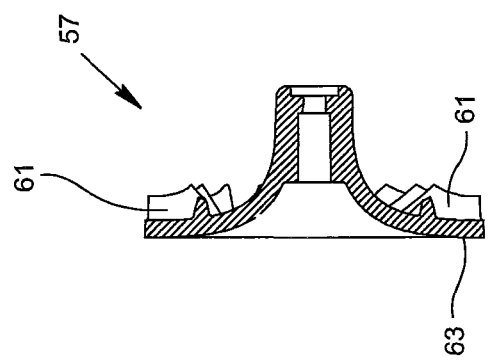

With specific reference to FIGS. 5A-5C, rotor 57 is provided as a Francis-type turbine. A Francis-type turbine is a type of water turbine that was developed by James B. Francis and has an inward flow reaction turbine that combines radial and axial flow concepts. More specifically, a Francis-type turbine is a reaction turbine, which means that the working fluid changes pressure as it moves through the turbine, giving up its energy. Francis-type turbines are typically used in large-scale hydroelectric producing plants, such as at the base of a dam. Volute 51, stator 53, and rotor 57 are preferably embodied as a small-scale Francis-type turbine and include a plurality of guide blades 55 configured to direct the water tangentially to rotor 57. This flow acts on rotor blades 61, causing rotor 57 to spin. Rotor blade 61 spacing may vary between about 3.7 mm to about 6.3 mm apart and may be rotated 65 degrees counter-clockwise from a line tangent to a rotor body 63.

Figures 6A, 6B:
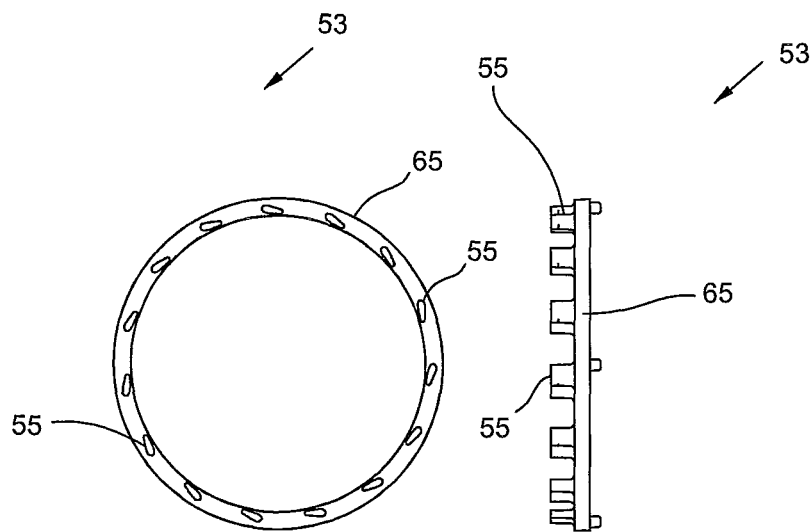
FIGS. 6A and 6B are a top plan view and a side view, respectively, of one embodiment of a stator of a power generating device of the hydrogenerator flush valve in accordance with the present invention.
Figures 6C, 6D:
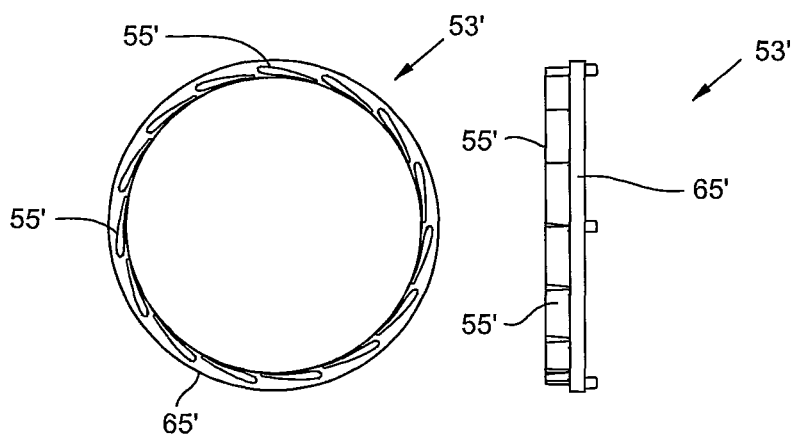
FIGS. 6C and 6D are a top plan view and a side view, respectively, of another embodiment of a stator of a power generating device of the hydrogenerator flush valve in accordance with the present invention.
Figures 6E, 6F:
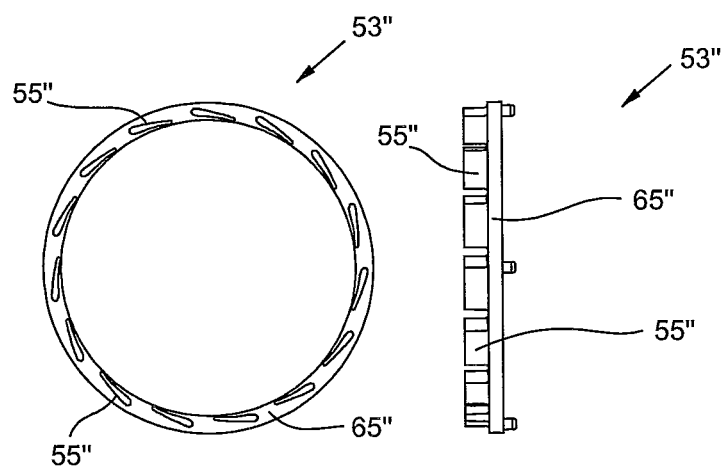
FIGS. 6E and 6F are a top plan view and a side view, respectively, of still another embodiment of a stator of a power generating device of the hydrogenerator flush valve in accordance with the present invention.
Figure 11:
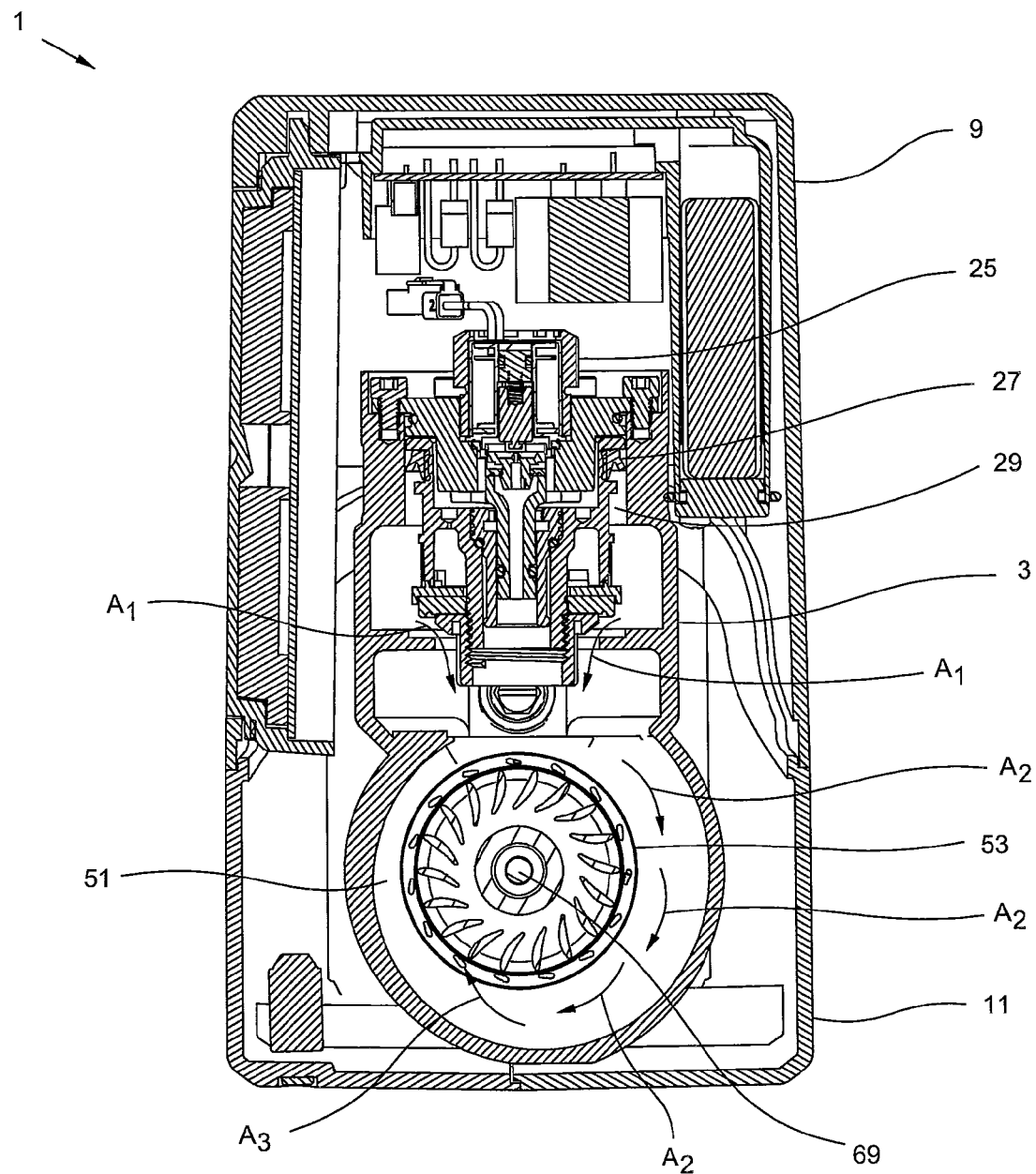
FIG. 11 is a cross-sectional view of the hydrogenerator flush valve of FIG. 1.

With specific reference to FIGS. 6A and 6B, stator 53 includes a circular, O-shaped body 65 having a plurality of blades 55 equally spaced around a circumference thereof. The stator 53 shown in FIGS. 6A and 6B is optimized for use in a water closet flush valve. An alternative embodiment of stator 53' is illustrated in FIGS. 6C and 6D. Stator 53' also includes a circular, O-shaped body 65' having a plurality of blades 55' equally spaced around a circumference thereof. Stator 53' is optimized for use in a low flow rate urinal flush valve. Yet another alternative embodiment of stator 53" is illustrated in FIGS. 6E and 6F. Stator 53" also includes a circular, O-shaped body 65" having a plurality of blades 55" equally spaced around a circumference thereof. Stator 53" is optimized for use in a urinal flush valve. The spacing of blades 55, 55', and 55" is set such that they are close enough to maximize the power obtained with the least amount of head loss. For instance, stator blades 55' may be spaced about 0.5 mm apart when provided in a low flow rate urinal flush valve (see FIGS. 6C and 6D), about 3.0 mm apart when provided in a urinal flush valve (see FIGS. 6E and 6F) or about 6.0 mm apart when provided in a water closet flush valve (see FIGS. 6A and 6B). In either instance, stator blades 55, 55', or 55" are rotated about 17 degrees clockwise from a line tangent to body 65, 65', or 65" of stator 53, 53', or 53". Rotor 57 is positioned within an opening of body 65, 65', or 65" as shown in FIG. 11.

Generator 59 may be embodied as a three-phase A.C., brushless motor having a drive shaft 67. The three-phase A.C., brushless motor may be a USAutomation USB101-03 motor. Rotor 57 is coupled to drive shaft 67 of the motor of generator 59 by a suitable fastening means, such as a screw 69. The rotation of rotor 57, therefore, would cause rotation of drive shaft 67 of the motor, thereby generating electricity.

Figure 7:
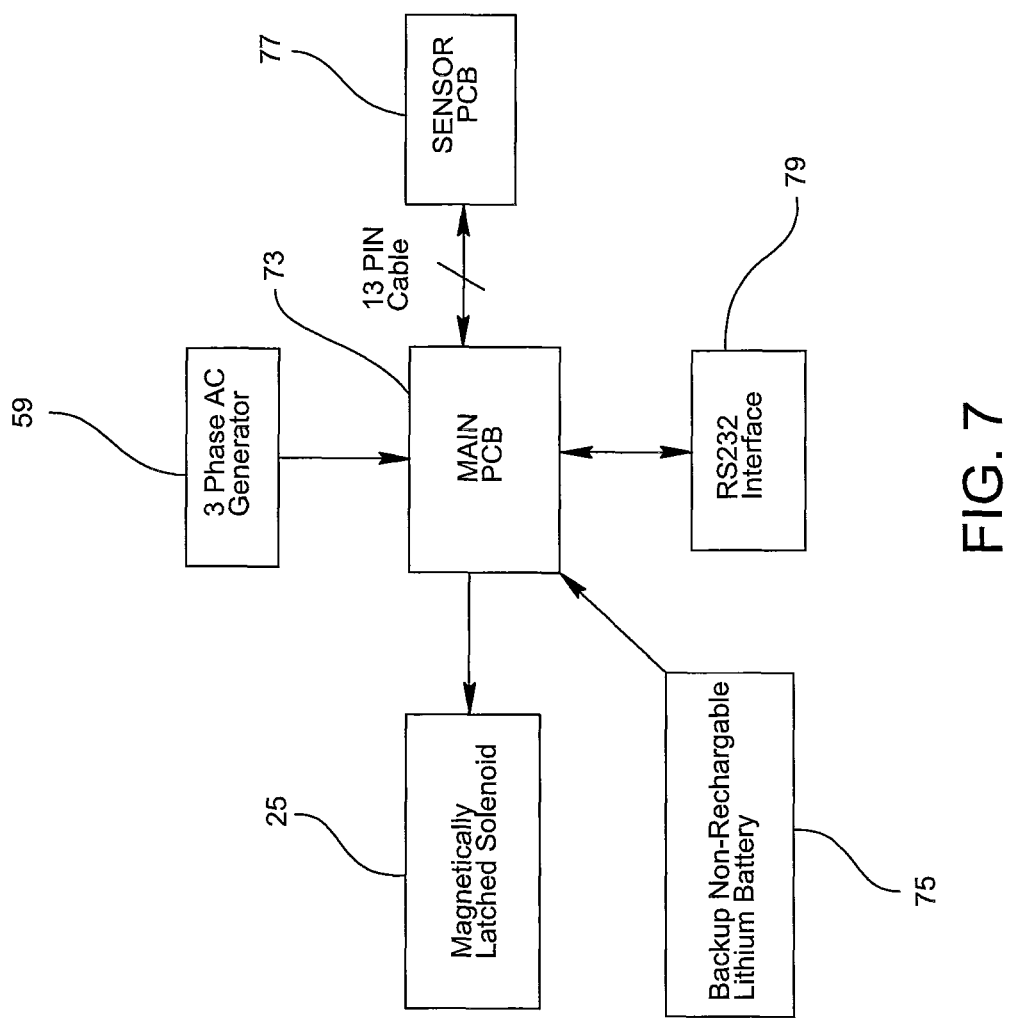
FIG. 7 is a block diagram illustrating a control system for use with the hydrogenerator flush valve in accordance with the present invention.

With reference to FIG. 7 and with continued reference to FIGS. 1 and 2, hydrogenerator flush valve 1 further includes a main printed circuit board (PCB)/battery assembly 71 mounted within an upper portion of upper valve cap 9. Main PCB/battery assembly 71 houses a control system mounted on a main PCB 73 and a backup battery 75. The control system may be embodied as a microcontroller or microprocessor. Battery 75 is desirably a non-rechargeable lithium battery. However, this is not to be construed as limiting the present invention as any suitable battery may be utilized. Solenoid valve 25, battery 75, a sensor array 77, a communication interface 79, and generator 59 are operationally coupled to the control system mounted on main PCB 73. Further, a charging device, discussed in greater detail hereinafter, is provided in the control system. The charging device stores electric energy generated by generator 59 and supplies the stored electric energy to respective portions of hydrogenerator flush valve 1, such as solenoid valve 25 and sensor array 77.

Sensor array 77 includes a human body detection system that includes a first infrared emitter 81, a second infrared emitter 83, and a detector sensor 85 positioned in a vertical row, such that first infrared emitter 81 is at the top of the row, second infrared emitter 83 is at the bottom of the row, and detector sensor 85 is midway between first infrared emitter 81 and second infrared emitter 83. First and second infrared emitters 81, 83 are further positioned in the vertical row such that the infrared beams produced by each cross at approximately 11 inches and at approximately 33 inches. This illuminates the area of interest and assists in preventing false positive detections as the beams cross twice before they reach the door of a stall where hydrogenerator flush valve 1 is positioned.

Detector sensor 85 is embodied as an integrated circuit that includes an infrared proximity detector and an ambient light detector. The ambient light detector may be used in a power saving feature to put the control system to sleep when ambient light is below a certain threshold as will be discussed in greater detail hereinafter. An example of such a detector sensor 85 is the TSL2771 light-to-digital converter manufactured by TAOS, Inc. of Plano, Tex. The combination of the infrared proximity detector and the ambient light detector enables occupant detection based on a pattern of decreased/increased ambient light reflections followed by increasing infrared reflections and occupant absence by decreasing infrared reflections and increased/decreased ambient light. The ambient light pattern varies based on the position of the light source relative to the valve and the reflectivity of user. Occupant detection based on Pattern Recognition would eliminate the uncontrolled variable of infrared absorption rate of various clothing materials, which is a common problem for other proximity sensors based solely on infrared reflections. Detector sensor 85 is precisely positioned behind a focusing lens 86 which focuses the reflected infrared light from first and second infrared emitters 81 and 83 and ambient light from the surroundings. The lens 86 reduces the power requirements needed for first and second infrared emitters 81 and 83 by focusing the infrared (IR) reflections from a larger surface area directly onto the sensor. The level of reflections seen is increased so the amount of IR emitted can be reduced while maintaining the same level of received reflections, thereby reducing the power consumption of the system.

Sensor array 77 may further include a plurality of status light emitting diodes (LEDs) 89 provided in the vertical row with first infrared emitter 81, second infrared emitter 83, and detector sensor 85 to provide information to a user regarding the status of hydrogenerator flush valve 1. In an exemplary embodiment, as shown in FIG. 1, two status LEDs 89 may be positioned above detector sensor 85. One of these status LEDs 89 is blue and the other is green. In addition, two status LEDs 89 may be positioned below detector sensor 85. One of these status LEDs 89 is blue and the other is green. Accordingly, various information can be provided to the user based on which status LEDs 89 are lit. An example of such information is provided in Table 1 as follows (where S=second and V=volt):

TABLE 1

| Condition | LED Color | Cycle |
| --- | --- | --- |
| Low Battery/ Battery Issue | Green (Top)/Blue (Top) | Flash once every X seconds during "normal" operation |
| Solenoid Issue | Blue (Bottom)/Green (Bottom) | Flash once every X seconds during "normal" operation |

TABLE 1-continued

| Condition | LED Color | Cycle |
|---|---|---|
| Generator Issue | Green (Top)/Blue (Bottom) | Flash once every X seconds during "normal" operation |
| Sensor Issue | Blue (Bottom)/Green (Bottom)/Green (Top) | Flash once every X seconds during "normal" operation |
| User Detection | Blue (Top) | Flash with each sensor pulse during user confirmation |
| User Absence | Green (Top) | Only occurs after user confirmation has been detected |
| Good Cycle/Supercapacitor Charge Level Status operation (occurs at flush) | All 4 LEDs top to bottom for 0.5S | Light blue bottom if charge <=2.75 V<br>Light blue bottom and green bottom if >2.75 V & <=5.5 V<br>Light blue bottom, green bottom, green top if >5.5 V & <=8.25 V<br>Light all 4 if >8.25 V |
| Going to sleep/low light detected for X time | Blue (Bottom)/Blue (Top) | Single cycle for 2S |
| Low light detected | All 4 | Single cycle for 0.25S |
| Bright light detected | All 4 | Single cycle for 0.25S |

In addition, a microcontroller can use input from the power generating device to determine if solenoid valve 25 is operating properly. More specifically, when solenoid valve 25 is activated, the power generated by the power generating device is analyzed by the microcontroller, in addition to the load switch in the event that the supercapacitor is fully charged, to determine whether solenoid valve 25 is opening and closing properly. For instance, if the power generating device continues to generate power even when the microcontroller has sent a signal to close the solenoid valve 25, this could mean that the solenoid valve 25 is malfunctioning and has remained open. Accordingly, the microcontroller will send a signal to have one or more of status LEDs 89 to turn on to alert a user that solenoid valve 25 is malfunctioning. The microcontroller will also attempt to close solenoid valve 25 several times after the failure is noted. The same procedure is followed if solenoid valve 25 fails to open properly.

With reference to FIGS. 8A-8C, 9, and 10 and with continuing reference to FIGS. 1 and 2, the operation of the control system and charging circuitry will be described in greater detail. First, power is generated by generator 59 of the power generating device as described hereinabove at block 700. The output of generator 59 is rectified by a six-diode rectifier 91 provided in series therewith at block 701. A load switch 93 is provided between rectifier 91 and a main supercapacitor 95. Main supercapacitor 95 may be a 0.47 F capacitor capable of charging up to 11VDC. Load switch 93 is automatic and is controlled by a set threshold voltage to protect overcharging of main supercapacitor 95 and the state of load switch 93 is monitored by the microcontroller at block 702. If the charge on main supercapacitor 95 is below 11VDC, load switch 93 remains open and main supercapacitor 95 continues to store the electrical energy produced by generator 59. If, at block 703, the load switch threshold level is met and the charge on main supercapacitor 95 has reached 11VDC, load switch 93 is enabled and monitored by the microcontroller, thereby preventing any additional electrical energy generated by generator 59 from charging main supercapacitor 95. Once the charge on main supercapacitor 95 falls below 11VDC, load switch 93 returns to the disabled position, thereby allowing main supercapacitor 95 to again be charged by the electrical energy produced by generator 59.

Thereafter, at block 704, the microcontroller determines whether a buck converter 97 or boost converter 99 should be enabled based on the voltage of main supercapacitor 95 to either charge a secondary supercapacitor 101 capable of charging up to 3.3VDC or boost main supercapacitor 95 directly to a comparator circuit. If the charge on main supercapacitor 95 is greater than 3.3VDC, the buck converter 97 is enabled at block 705. The buck converter 97 charges secondary supercapacitor 101 to 3.3VDC at block 706. At block 707, a load switch is enabled to disable secondary supercapacitor 101 from the circuit when main supercapacitor 95 has a voltage that is below 3.3VDC and boosted to provide power to solenoid valve 25 and/or sensor array 77. This voltage is then fed into a comparator circuit at block 800 as will be described in greater detail hereinafter. At blocks 708-710, boost converter 99 is enabled by a load switch 103 when the voltage on main supercapacitor 95 drops to between 1.5VDC and 3VDC. Load switch 103 is enabled/disabled by the microcontroller. Boost converter 99 increases the voltage from main supercapacitor 95 to 3.3VDC when load switch 103 is enabled. This voltage is then fed into a comparator circuit at block 800 as will be described in greater detail hereinafter.

Figure 8A:
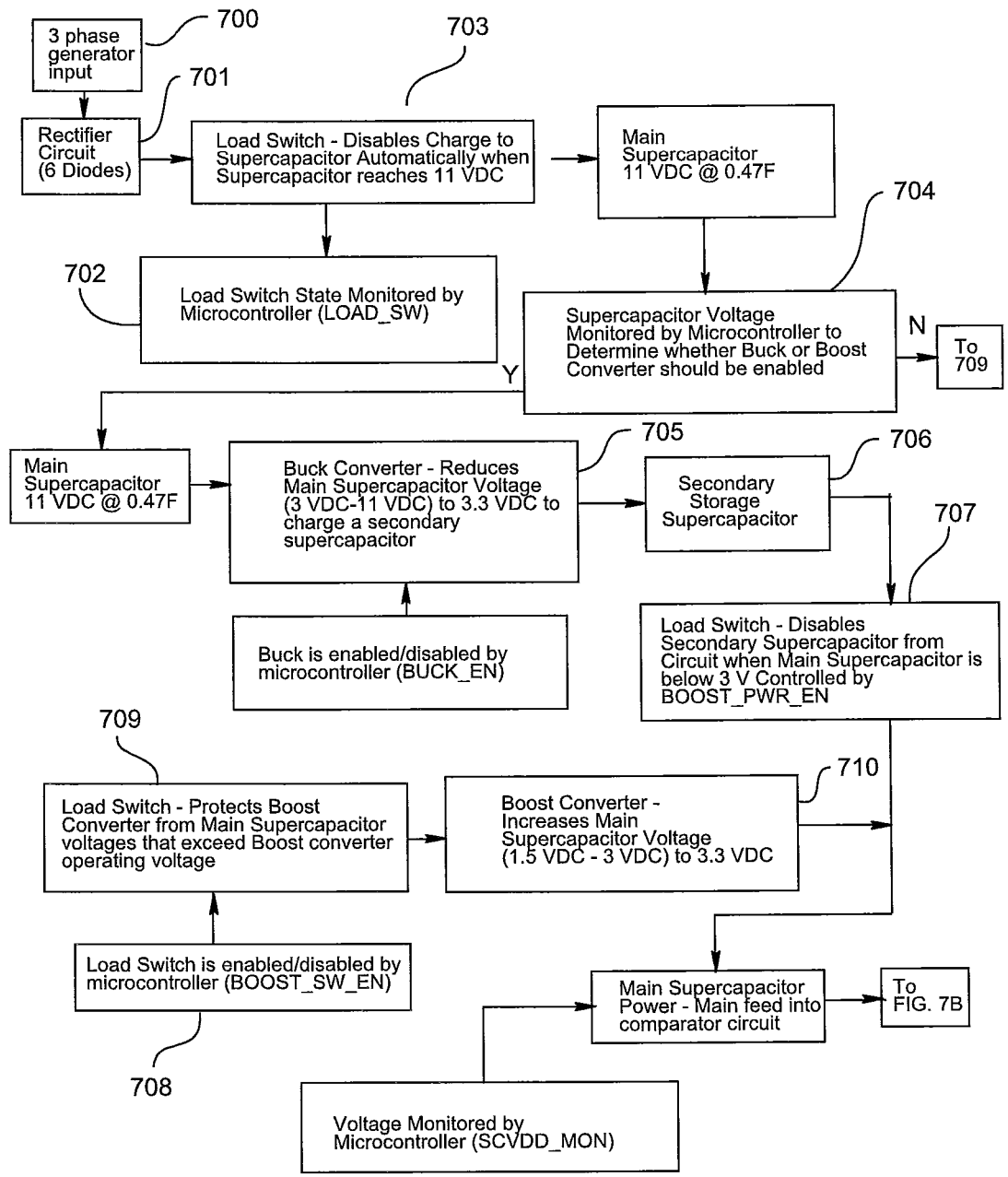
FIGS. 8A-8C are flow diagrams illustrating the method performed by charging circuitry to charge a supercapacitor from the power generating device in accordance with the present invention.
Figure 8B:
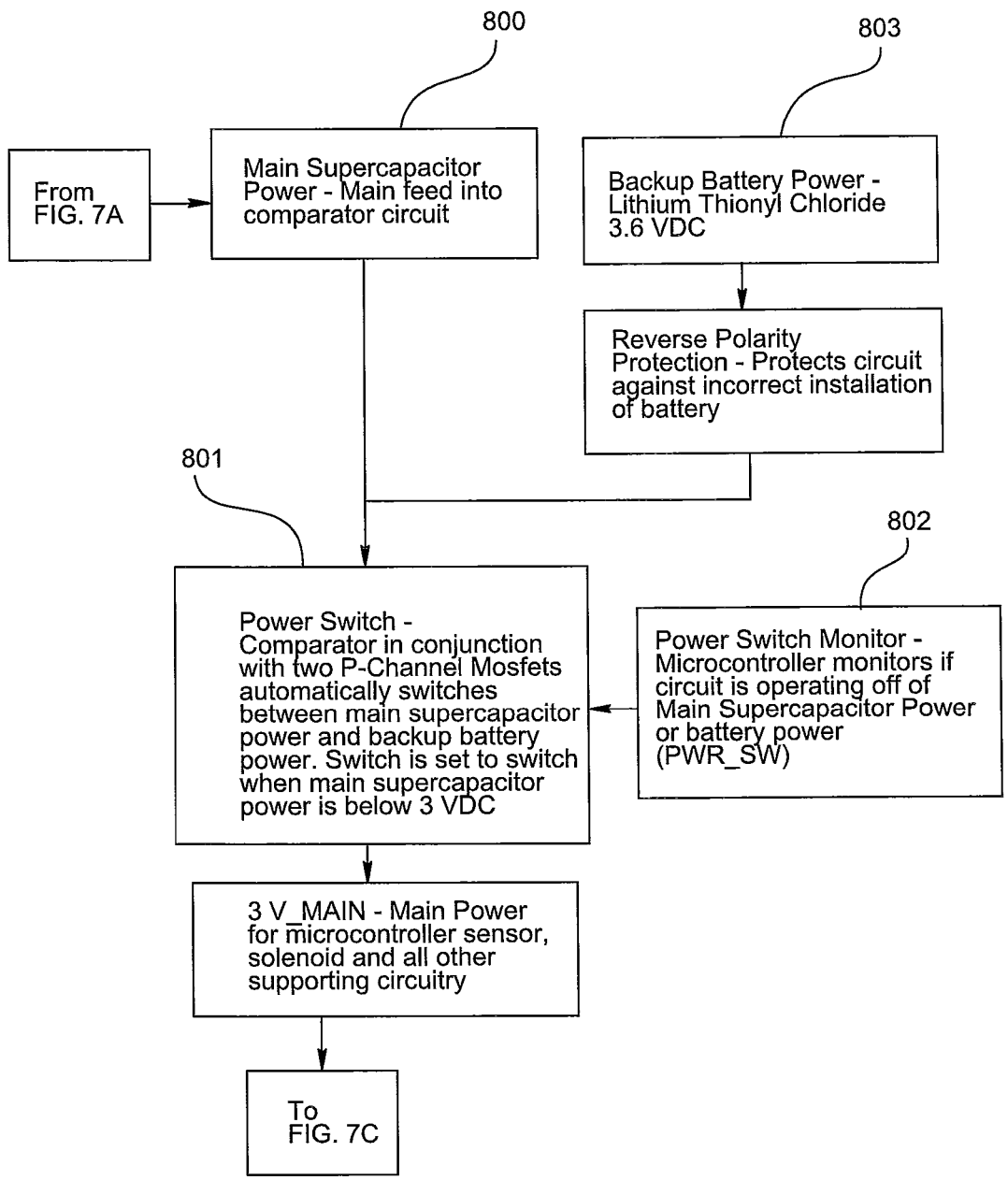
Figure 10:
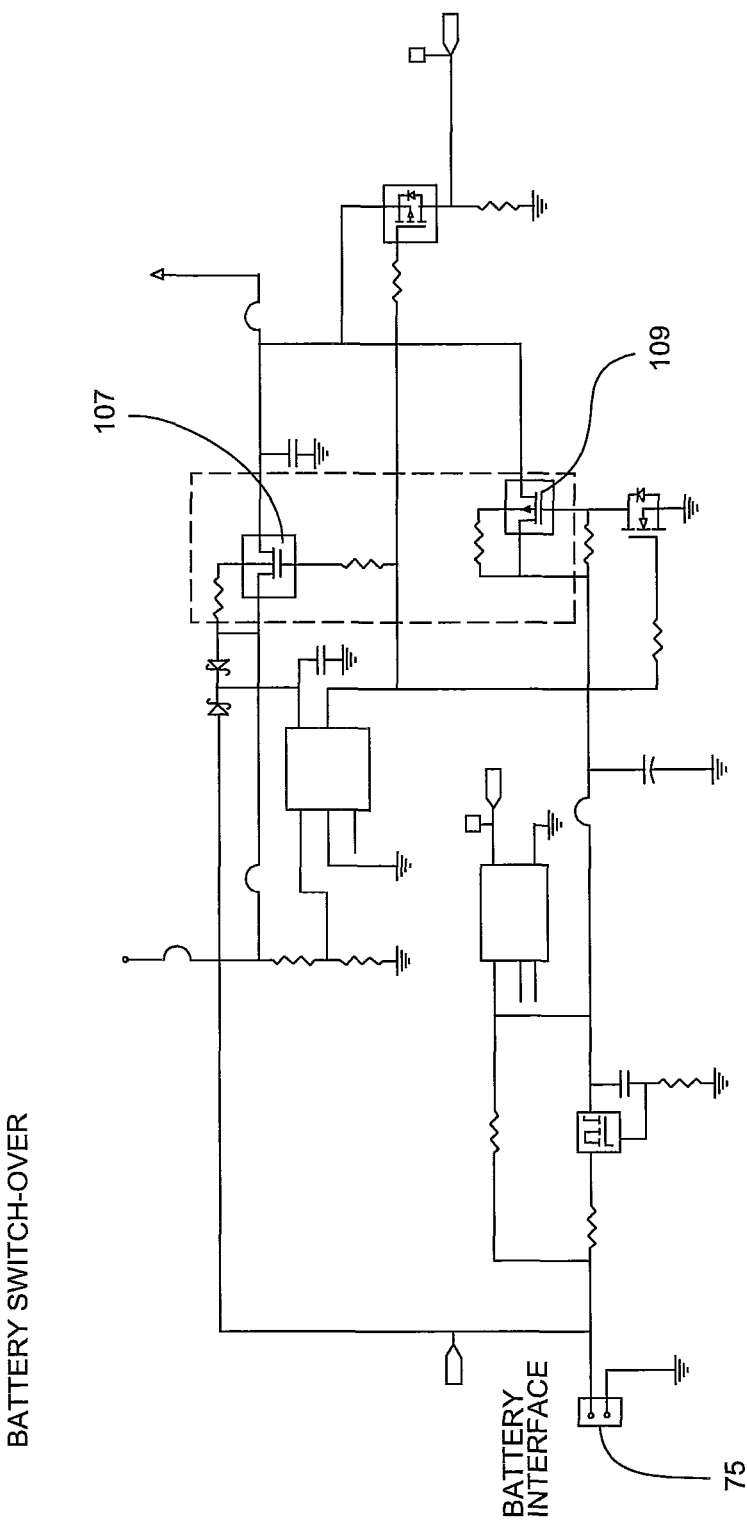

With specific reference to FIGS. 8B and 10, the main supercapacitor power from either secondary supercapacitor voltage or boost converter voltage is fed to a comparator that works in conjunction with a first p-channel MOSFET 107 and a second p-channel MOSFET 109 at block 801 to automatically switch between the main supercapacitor power and backup battery 75 power (see block 803) based on a set threshold voltage and is monitored by the microcontroller provided at block 802. This automatic switching occurs when main supercapacitor 95 has a voltage below 3VDC. The output of the comparator is a 3V main power source provided from main supercapacitor 95 if sufficiently charged by generator 59 or from backup battery 75 (see block 803).

Figure 8C:
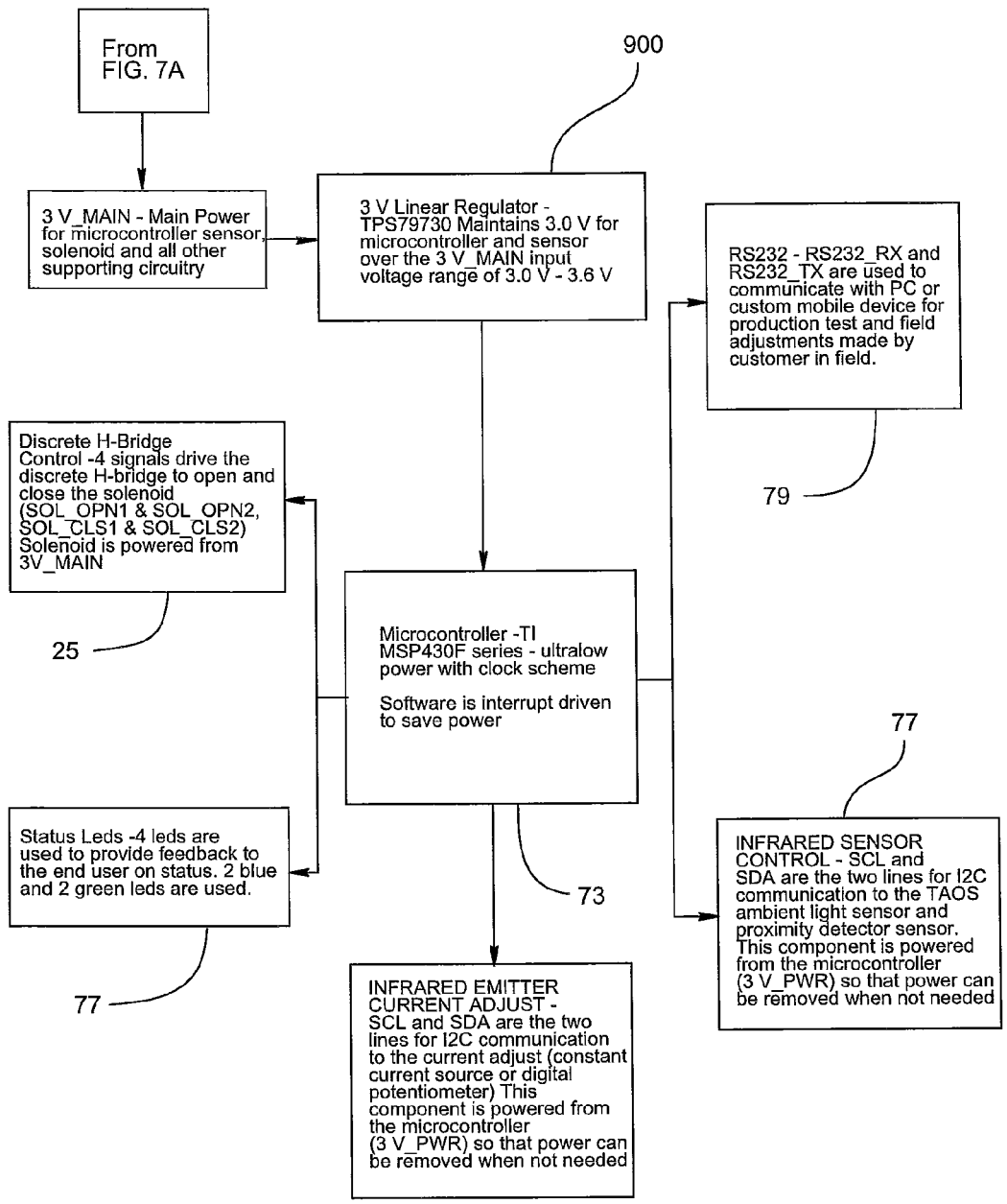
Figure 9:
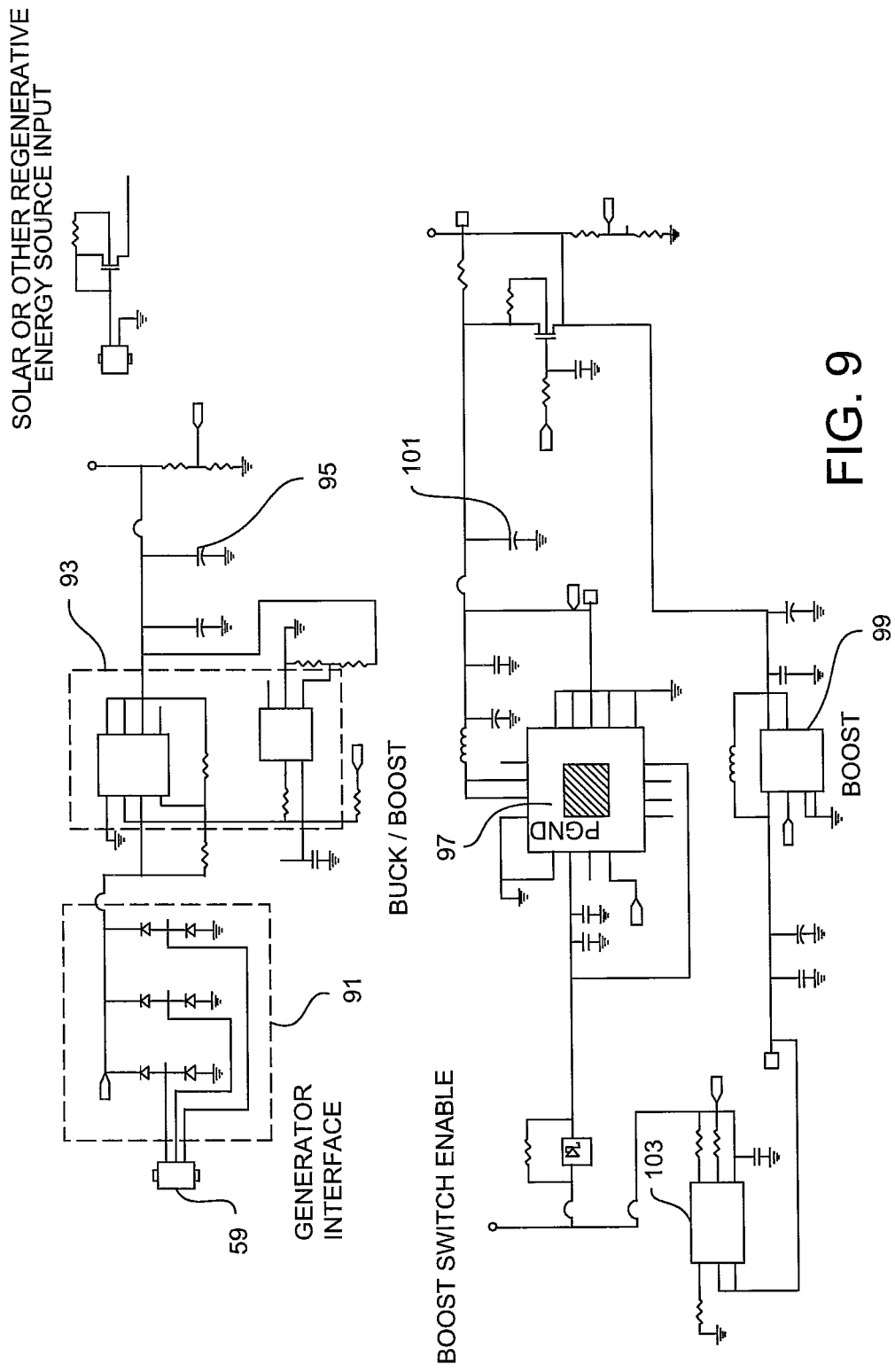
FIGS. 9 and 10 are circuit diagrams illustrating the circuitry required for performing the method of FIGS. 8A-8C.

With specific reference to FIG. 8C, the 3V main power source is provided to a 3V linear regulator at block 900. The 3V linear regulator maintains 3.0V for the microcontroller and sensor over the 3V main power source voltage range of about 3.0V to 3.6V. The output of the 3V linear regulator is then provided to the microcontroller on main PCB 73 which controls solenoid valve 25, sensor array 77, and communication interface 79.

Communication interface 79 may be an RS232 interface and is used to allow the microcontroller to communicate with a personal computer (PC) or a custom mobile device for production tests and field adjustments made by the customer in the field. Hydrogenerator flush valve 1 may be physically connected, via communication interface 79, to the PC or mobile device via TTL-232R-3V3-AJ USB-to-TTL Level Serial Cable. Alternatively, the communication interface 79 may be a wireless interface.

In addition, the microcontroller of hydrogenerator flush valve 1 provides various power saving features. Previous automatic flush valves have been controlled to have the sensors send an infrared beam once per second, 24 hours per day, every day of the year that it is in service. However, since hydrogenerator flush valve 1 is configured to run off of power generated by generator 59, the following sensor detection control algorithm will be used to save power and still detect a user. First, detector sensor 85 looks for changes in the ambient light level at a default sampling rate of 2 seconds. If the ambient light level changes by more than 5% between two consecutive readings, this indicates a user may be present. The first and second infrared emitters 81 and 83 are then turned on to confirm the presence of a user and subsequently used to detect the absence of the user.

The microcontroller of hydrogenerator flush valve 1 can also be programmed to include a dual flush water saving feature as follows: 1) if detector sensor 85 detects that a person is present for less than 60 seconds, the microcontroller will control hydrogenerator flush valve 1 to provide a short flush (1.1 gpf/4.2 Lpf); and 2) if detector sensor 85 detects that a person is present for more than 60 seconds, the microcontroller will control hydrogenerator flush valve 1 to provide a normal flush (1.6 gpf/6.0 Lpf).

The ambient light sensor of detector sensor 85 is a critical part of the power saving features. There are two phases in which the detector sensor 85 operates: 1) during a seven day Environmental Trending data collection period; and 2) after the Environmental Trending is complete and a trend has been successfully established. Both phases utilize power saving measures. During the data collection period, the default ambient light sampling rate is 2 seconds. If the detector sensor 85 has not sensed a person within the last 2 hours, the ambient light sampling rate is reduced to 3 seconds. If detector sensor 85 has not sensed a person within the last 4 hours, the ambient light sampling rate is reduced to 4 seconds. After a trend is successfully established following the seven day data collection period, in hours of activity the default ambient light sampling rate is 2 seconds. In hours of inactivity and low light (established by the trend), the sampling rate is reduced to 10 seconds or "sleep" mode. The control system of the valve thereafter looks ahead to the next hour in the trend. If the next hour has no activity and low light, the sampling rate remains at 10 seconds. If the next hour has activity or an increase in ambient light, the sampling rate is increased to 2 seconds. "Sleep" is the flush valve mode in which the control system of hydrogenerator flush valve 1 only checks the ambient light level every 10 seconds.

More specifically, the microcontroller continually monitors ambient light and traffic patterns to maximize the power savings based on the installation environment, or environmental trending. During every check for an occupant, the ambient light level will be recorded. The ambient light level will be recorded over a period of one hour. The number of activations that occur during that one hour will also be recorded. For each hour of the day for a certain number of days, the average ambient light level and number of activations will be recorded to develop a trend. This trend will provide two features: 1) will associate a light level with activity to provide a baseline light level for comparison to when the environment is determined to be "dark" since each install light level is unique; and 2) will allow the unit to go to sleep faster based on data from the trend. If, based on the trend, no occupants are sensed between 10:00 pm-5:00 am over a seven-day period of environmental trending data, the ambient light sensor can sample less often than the time between 5:00 am-6:00 am where activity level, based on trending data, increases. This allows the flush valve to distinguish between night time or an install location that simply has a light sensor that turns the light on or off based on the occupant entering or leaving the bathroom. A change in activity level will result in a new environment adjustment sequence for a period of seven days. Before or between an environmental adjustment sequence is complete, the valve sampling rate will be based on activity level.

With reference to FIG. 11 and with continued reference to FIGS. 1, 2, 4A, and 4B, the operation of hydrogenerator flush valve 1 is described in greater detail. It should be noted that hydrogenerator flush valve 1 includes a manually operated valve 111 that allows a user to manually flush the toilet and override the automatic flushing features of hydrogenerator flush valve 1.

Initially, in a state that solenoid valve 25 and manually operable valve 111 are closed, water which is supplied from water supply pipe 17 is permitted to fill an upper chamber 47 of piston kit 29 through orifice hole 46.

Thereafter, solenoid valve 25 is controlled by the microcontroller on main PCB 73 to move to an open, second position based on feedback from sensor array 77. This allows the water in upper chamber 47 to evacuate through passage 49 in solenoid flange 27, thereby causing piston kit 29 to move upward and allow water from water supply pipe 17 to flow in a direction of arrows $A_1$ (see FIG. 3E). Primary valve casing 3 is configured such that water received from water supply pipe 17 takes an approximately 90° turn within primary valve casing 3 and substantially all of the water is directed to volute 51. Volute 51 directs substantially all of the water received from water supply pipe 17 in a circumferential direction as indicated by arrows $A_2$ through the plurality of blades 55 of stator 53, as indicated by arrows $A_3$, to rotor 57, thereby causing rotor 57 to rotate (see FIG. 10). Since rotor 57 is coupled to generator 59, this rotation causes generator 59 to generate electricity as discussed in greater detail hereinabove. The water then makes another 90° turn within secondary valve casing 5 and escapes from water outlet pipe 21, as shown by arrow $A_4$, to evacuate the toilet bowl.

Thereafter, solenoid valve 25 is controlled by the microcontroller to return to the closed, first position and water fills upper chamber 47 through orifice hole 46. This causes the pressure to rise in upper chamber 47 until piston kit 29 has sealed to primary valve casing 3 with face seal 41, thereby blocking the flow of water from water supply pipe 17.

While the power generating device of the present invention has been described hereinabove for use with a flush valve for a water closet-type flushing device, this is not to be construed as limiting the present invention as the power generating device may be utilized in any suitable plumbing fixture such as, but not limited to, a urinal flush valve, a faucet, and a showerhead.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A power generating device for use with a flush valve, the power generating device comprising:
   a volute configured to receive water from a water supply pipe;
   a stator positioned in the volute, the stator having a circular, 0-shaped stator body that includes a plurality of stator blades equally spaced around a circumference thereof, and each of the plurality of stator blades positioned on the stator body such that each stator blade is rotated clockwise from a line tangent to the stator body;
   a rotor positioned within the stator, the rotor having a rotor body with a plurality of rotor blades positioned thereon, the plurality of rotor blades are surrounded by the plurality of stator blades, and each of the plurality of rotor blades positioned on the rotor body such that each rotor blade is rotated counter-clockwise from a line tangent to the rotor body; and
   a generator coupled to the rotor,
   wherein the volute directs substantially all of the water received from the water supply pipe in a circumferential direction through the plurality of blades of the stator to the rotor, thereby causing the rotor to rotate.

2. The power generating device of claim 1, wherein the rotor is a Francis-type turbine.

3. The power generating device of claim 1, wherein the generator is a three-phase A.C., brushless motor having a drive shaft.

4. The power generating device of claim 3, wherein the rotor is coupled to the drive shaft of the motor.

5. The power generating device of claim 3, wherein the rotation of the rotor causes rotation of the drive shaft of the motor, thereby generating electricity.

6. A hydrogenerator flush valve comprising:
   a housing;
   a solenoid valve disposed in the housing and configured to allow water to flow into the housing from a water supply pipe when in a first position and prevent water from flowing into the housing from the water supply pipe when in a second position; and
   a hydrogenerator disposed in the housing, the hydrogenerator comprising:
      a volute having a substantially circular cross-sectional shape and configured to receive substantially all of the water from a water supply pipe when the solenoid valve is in the first position;
      a stator having a plurality of blades positioned around a circumference thereof, the stator positioned within the volute;
      a rotor positioned within the stator, the rotor having a plurality of blades and the plurality of blades of the rotor are surrounded by the plurality of blades of the stator; and
      a generator coupled to the rotor,
   wherein the stator and the rotor are positioned within the volute such that the stator and the rotor are offset from a center of the substantially circular cross-sectional shape of the volute and the water received from the water supply pipe when the solenoid valve is in a first position takes an approximately 90° turn within the housing and substantially all of the water is directed to the volute, such that the water is directed in a circumferential direction by the volute through the plurality of blades of the stator to the rotor, thereby causing the rotor to rotate.

7. The hydrogenerator flush valve of claim 6, wherein the rotor is a Francis-type turbine.

8. The hydrogenerator flush valve of claim 6, wherein the generator is a three-phase A.C., brushless motor having a drive shaft.

9. The hydrogenerator flush valve of claim 8, wherein the rotor is coupled to the drive shaft of the motor.

10. The hydrogenerator flush valve of claim 8, wherein the rotation of the rotor causes rotation of the drive shaft of the motor, thereby generating electricity.

11. The hydrogenerator flush valve of claim 6, further comprising control and charging circuitry operationally coupled to the solenoid valve and the hydrogenerator.

12. The hydrogenerator flush valve of claim 11, wherein the control and charging circuitry is configured to store electrical energy generated by the hydrogenerator on at least one supercapacitor.

13. The hydrogenerator flush valve of claim 12, wherein the electrical energy stored on the at least one supercapacitor is used to power the solenoid valve.

14. The hydrogenerator flush valve of claim 11, further comprising a sensor array operationally coupled to the control and charging circuitry for detecting the presence of a user.

15. The hydrogenerator flush valve of claim 12, wherein the control and charging circuitry controls the solenoid valve to move from the first position to the second position and vice versa based on feedback from the sensor array.

* * * * *